(12) United States Patent
Mittler et al.

(10) Patent No.: US 10,520,977 B2
(45) Date of Patent: Dec. 31, 2019

(54) GAMING MACHINE MONITOR HINGE ASSEMBLY

(71) Applicant: IGT, Las Vegas, NV (US)

(72) Inventors: Jon P. Mittler, St. George, UT (US); Jack H. Brooks, Reno, NV (US)

(73) Assignee: IGT, Las Vegas, NV (US)

( * ) Notice: Subject to any disclaimer, the term of this patent is extended or adjusted under 35 U.S.C. 154(b) by 349 days.

(21) Appl. No.: 15/271,884

(22) Filed: Sep. 21, 2016

(65) Prior Publication Data

US 2018/0081391 A1 Mar. 22, 2018

(51) Int. Cl.
*G06F 1/16* (2006.01)
*G07F 17/32* (2006.01)

(52) U.S. Cl.
CPC ........ *G06F 1/1601* (2013.01); *G07F 17/3211* (2013.01); *G07F 17/3216* (2013.01)

(58) Field of Classification Search
CPC ............ G07F 17/3216; G07F 17/3211; G06F 1/1601; F16M 2200/061; F16M 2200/063; F16M 2200/065
USPC ....... 248/917, 919, 920, 277.1, 276.1–287.1, 248/274.1, 280.11, 278.1
See application file for complete search history.

(56) References Cited

U.S. PATENT DOCUMENTS

| | | | |
|---|---|---|---|
| 6,158,737 A * | 12/2000 | Cornell | A63F 7/027 273/118 A |
| 6,474,758 B1 | 11/2002 | Hedrick et al. | |
| 6,678,919 B1 | 1/2004 | Sokolov et al. | |
| 8,191,936 B2 | 6/2012 | Cole et al. | |
| 8,851,989 B2 | 10/2014 | Rosander et al. | |
| 2008/0055491 A1 | 3/2008 | Gordon et al. | |
| 2009/0221375 A1 * | 9/2009 | Luciano, Jr. | G07F 17/32 463/46 |
| 2014/0125913 A1 * | 5/2014 | Lee | G02B 6/0093 349/58 |
| 2016/0343204 A1 | 11/2016 | Maher et al. | |

OTHER PUBLICATIONS

Straight line linkages Publication, Mechanism Design (19 pages), Available prior to Sep. 21, 2016.
Norton, Robert L., Design of Machinery, pp. 120-132, Available prior to Sep. 21, 2016.

(Continued)

*Primary Examiner* — James S. McClellan
*Assistant Examiner* — Peter J Iannuzzi
(74) *Attorney, Agent, or Firm* — Neal, Gerber & Eisenberg LLP

(57) ABSTRACT

A gaming machine door hinge assembly configured to first primarily move a monitor outwardly from a housing of a cabinet of a gaming machine while at most slightly rotating the monitor, and then primarily rotate the monitor relative to the housing while continuing to move the monitor outwardly. This enables a relatively large curved monitor to be attached to the housing and openable in a way that provides full service access inside the cabinet while not interfering with a neighboring gaming machine. In various embodiments, the hinge assembly provides a compound opening motion of "mostly-translate-changing-to-mostly-rotate" when opening the hinge assembly as well as the opposite motion when closing the hinge assembly that happens automatically.

16 Claims, 31 Drawing Sheets

(56) References Cited

OTHER PUBLICATIONS

Sugatsune, Vertical Swing Lift-Up Mechanism SLUN-N, Internet download on Jan. 22, 2017 at http://www.sugatsune.com/products/productdetails.cfm?catid=6&subcatid=2&productid=SLUN-N (2 pages), Available prior to Sep. 21, 2016.

Swisco, 14" Four Bar Hinge, 45 Degree, Heavy Duty, Internet download on Jan. 22, 2017 at http://www.swisco.com/14-four-bar-hinge/pd/Replacement-Window-Operator-Accessories/36-023HD (2 pages), Available prior to Sep. 21, 2016.

* cited by examiner

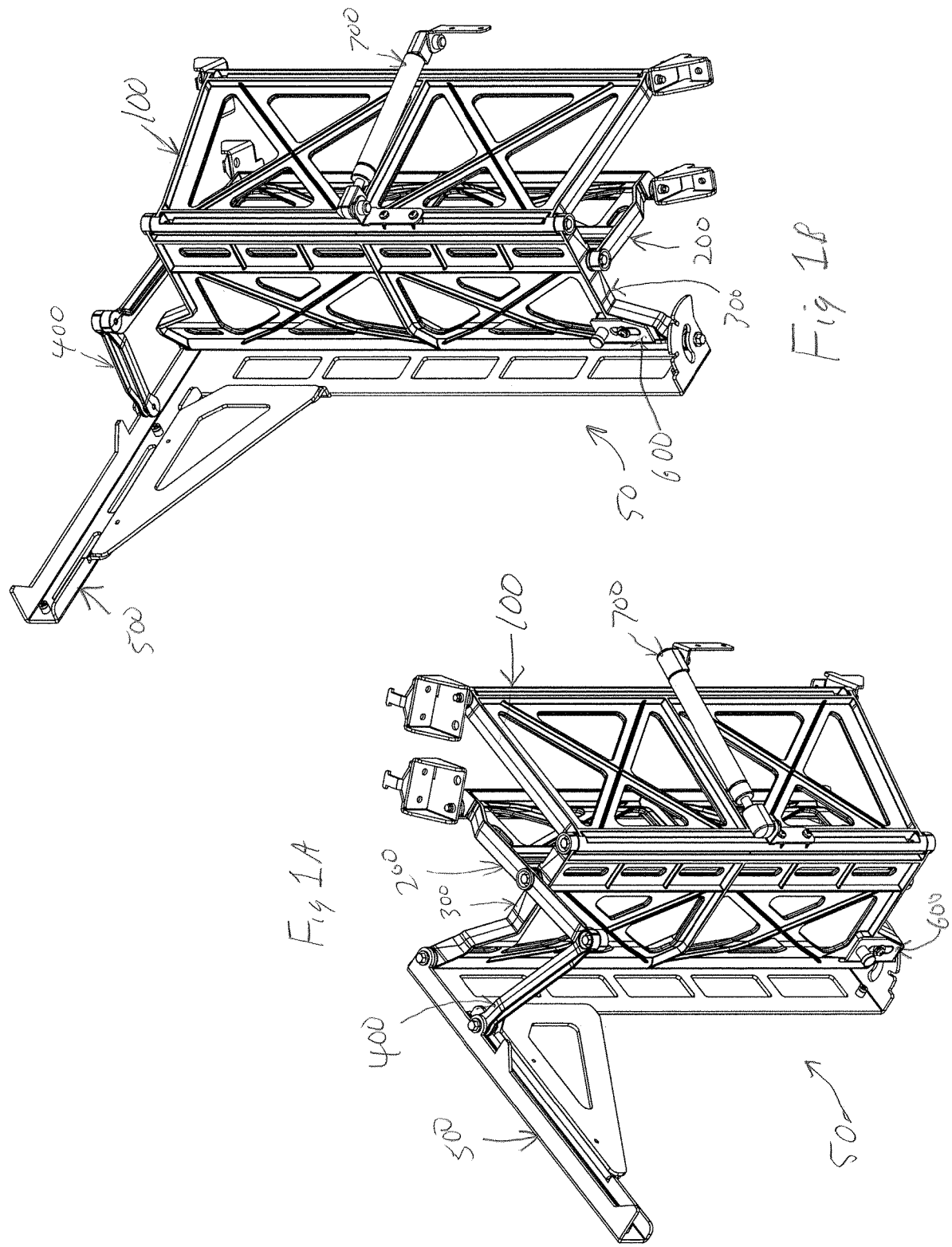

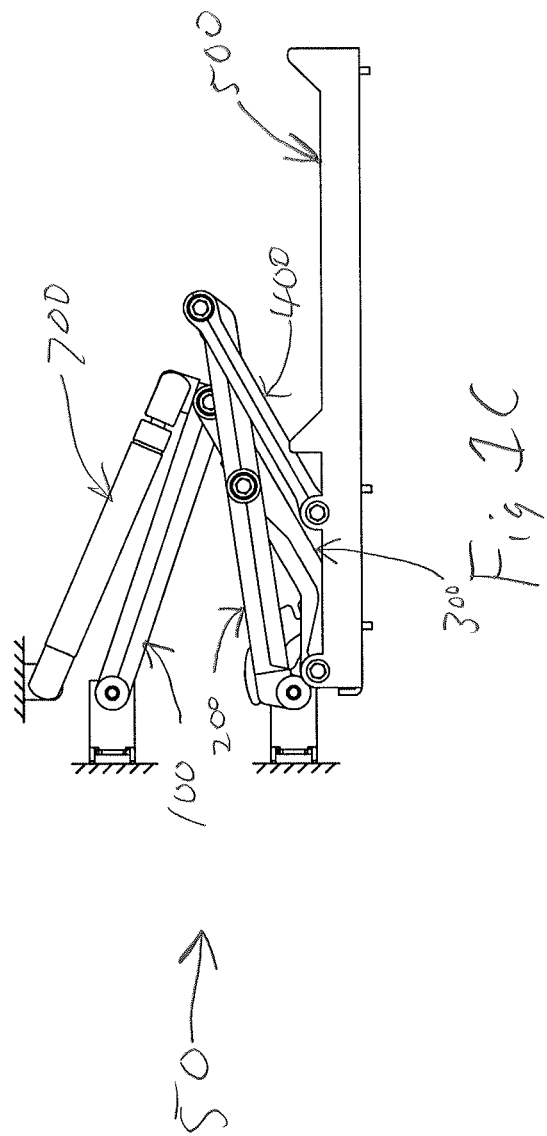

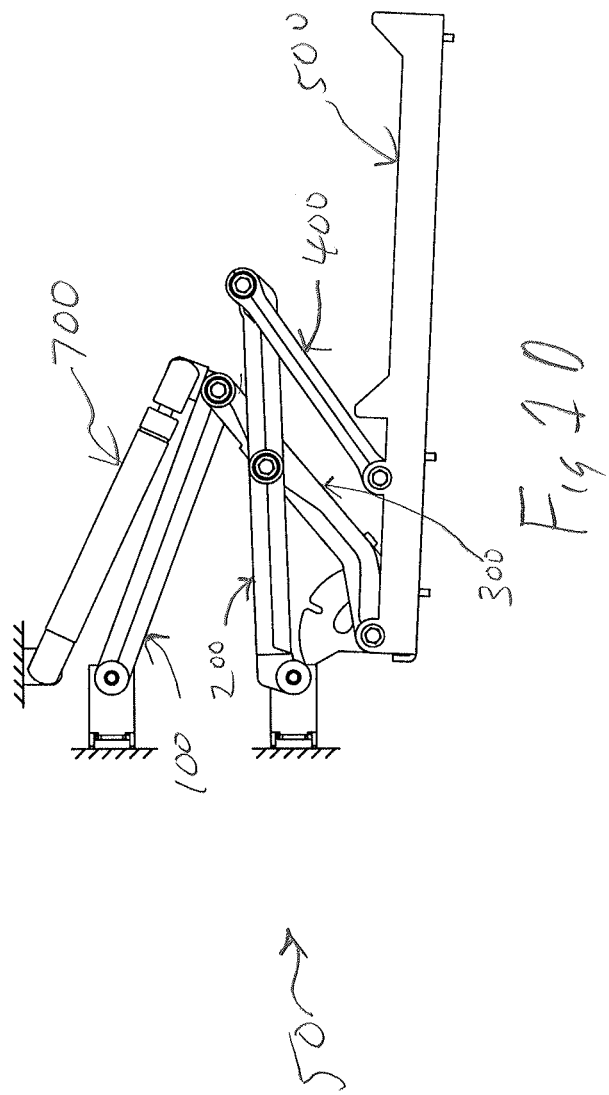

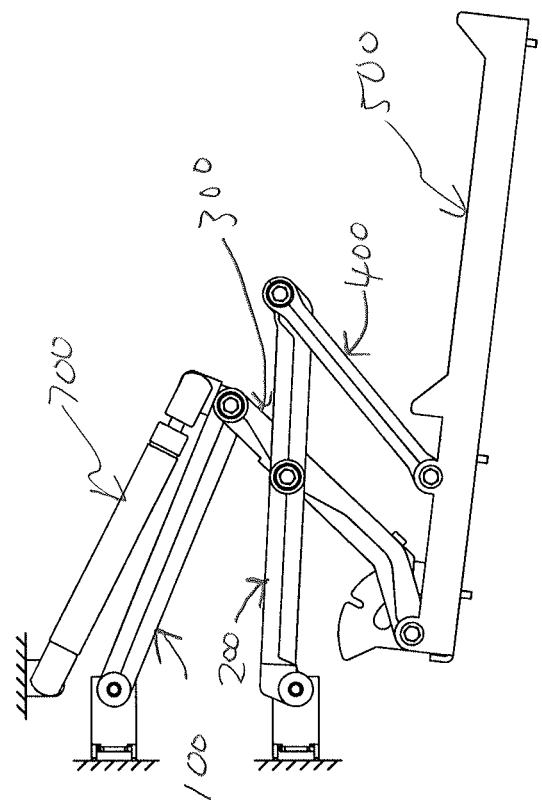

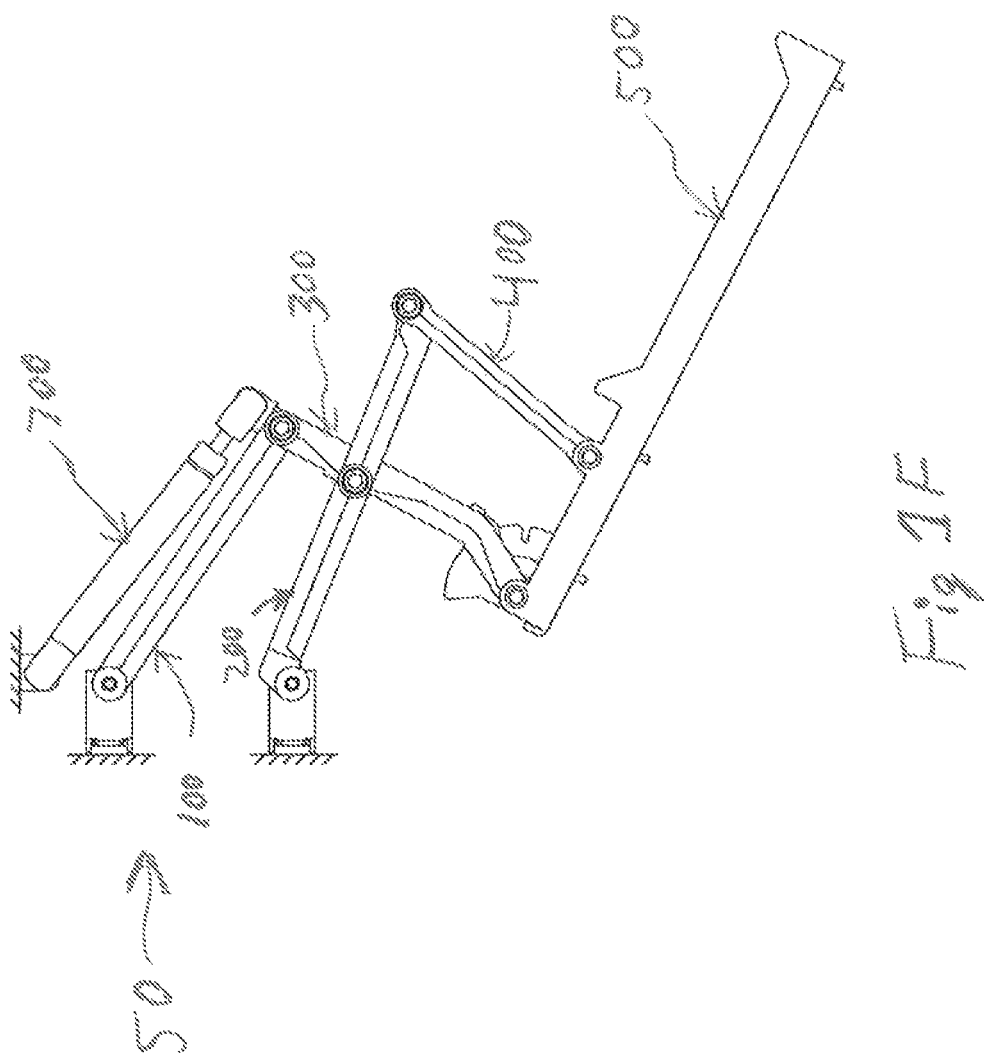

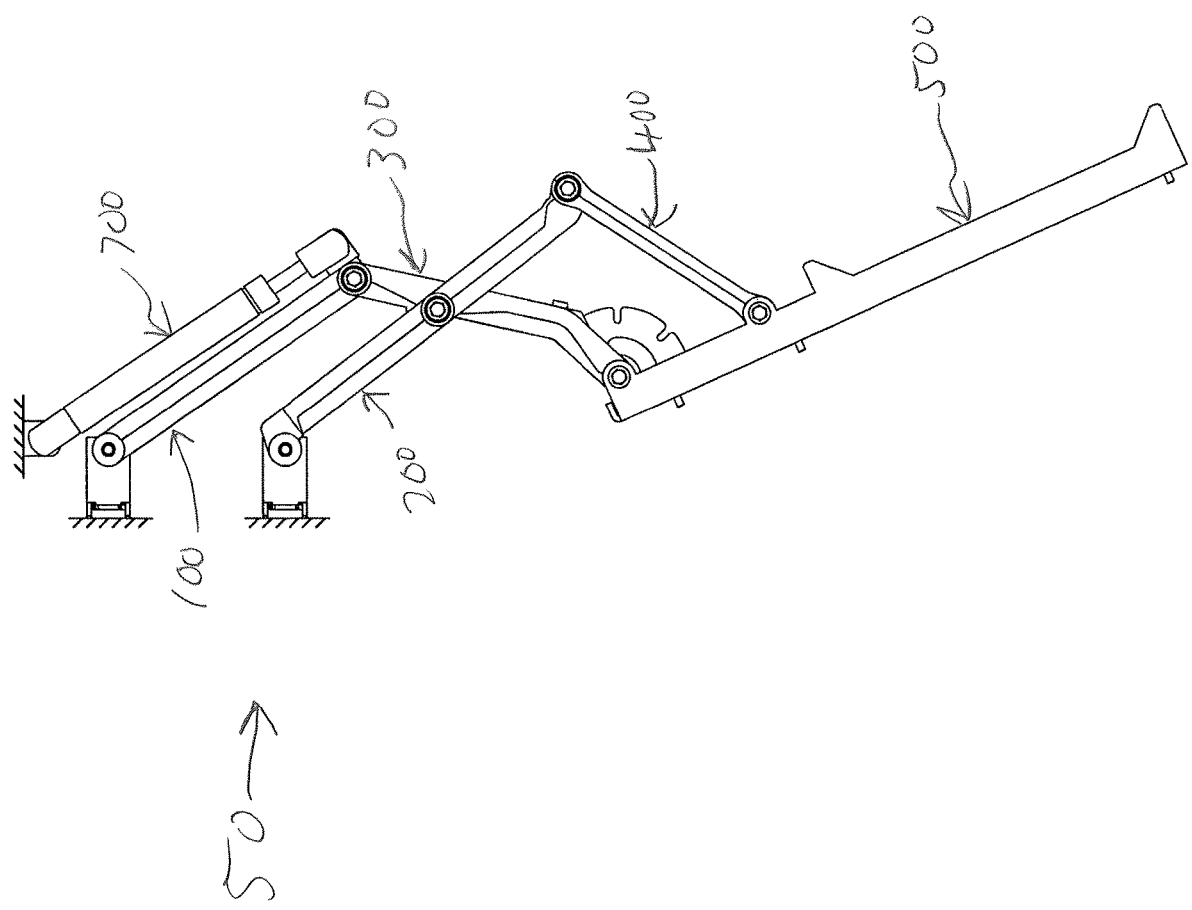

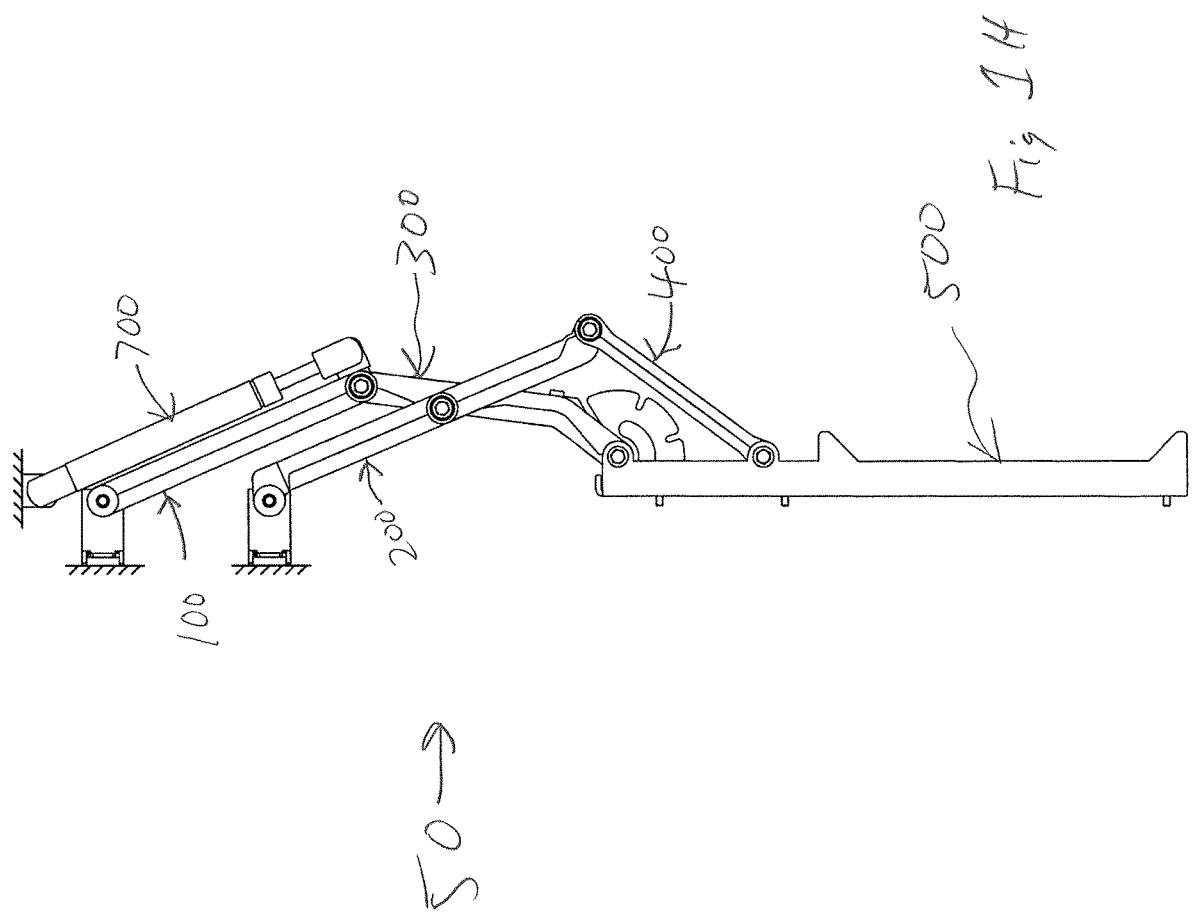

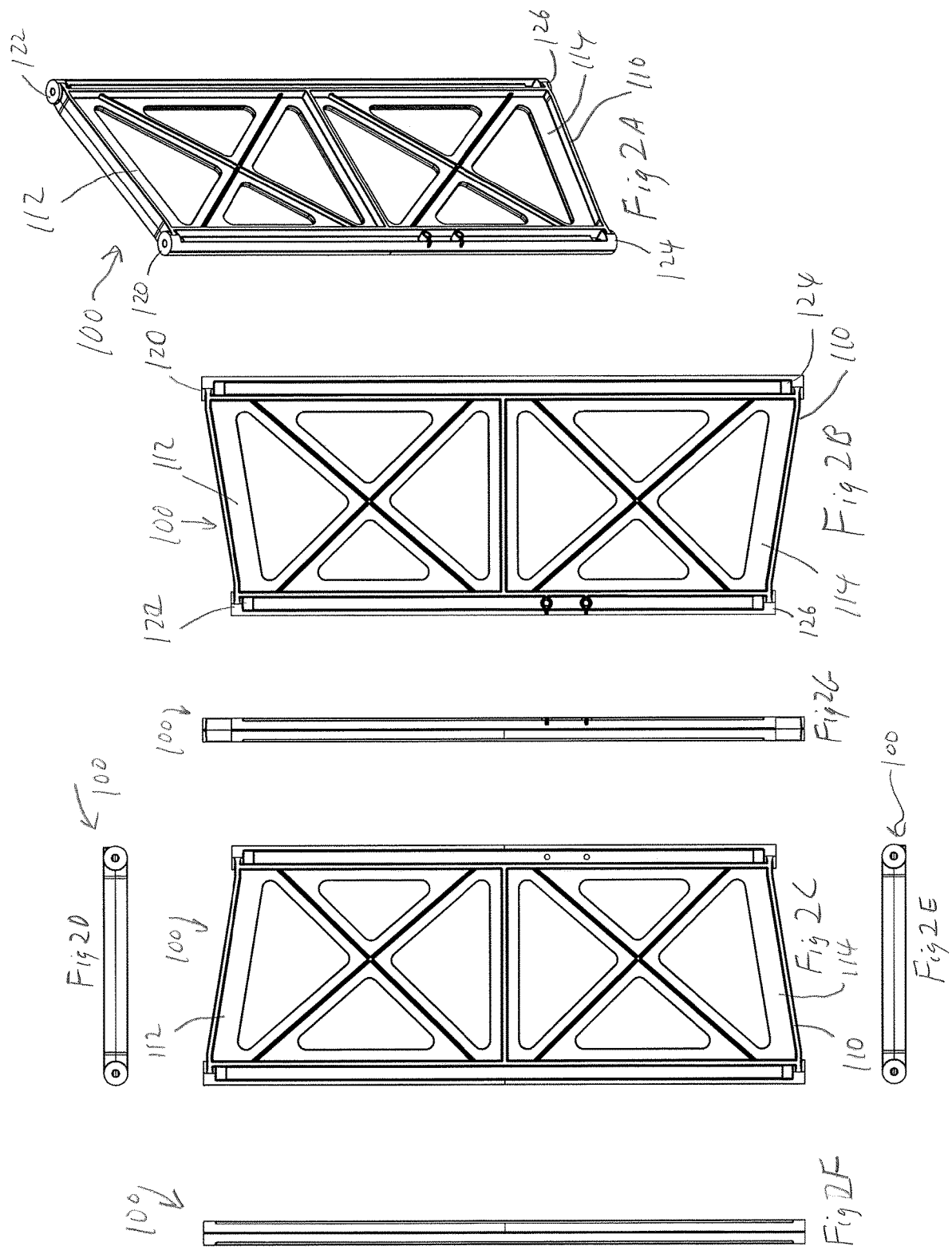

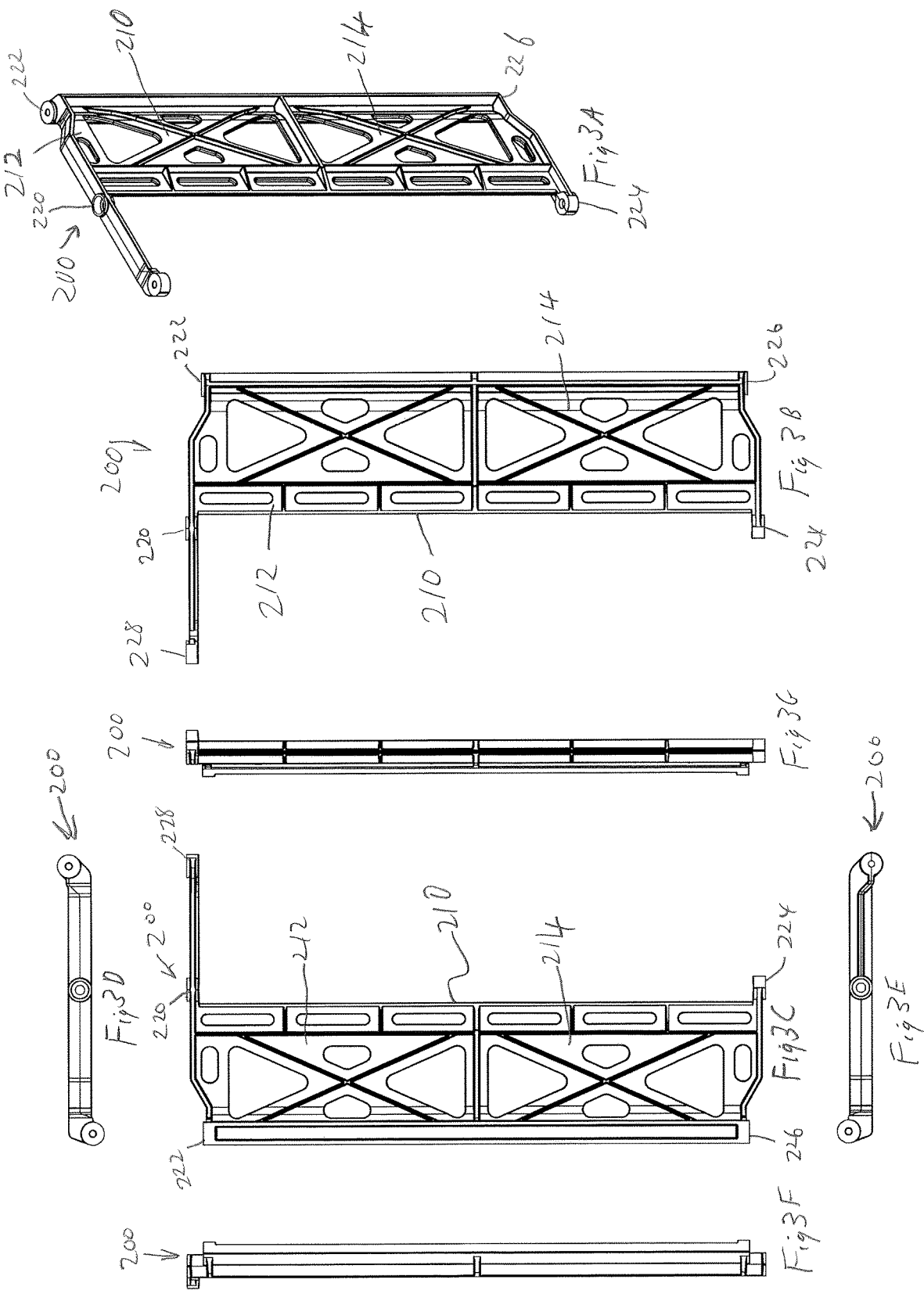

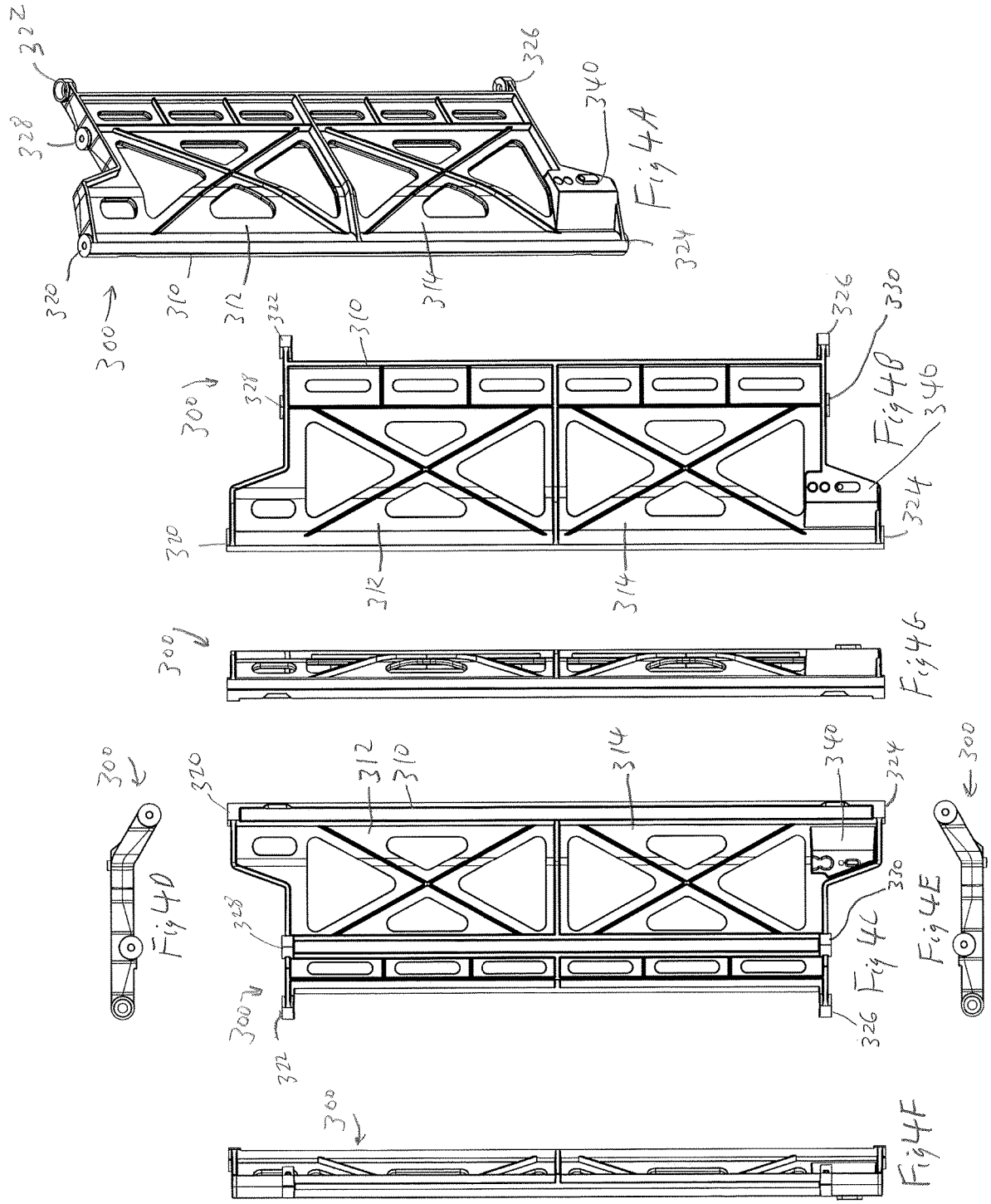

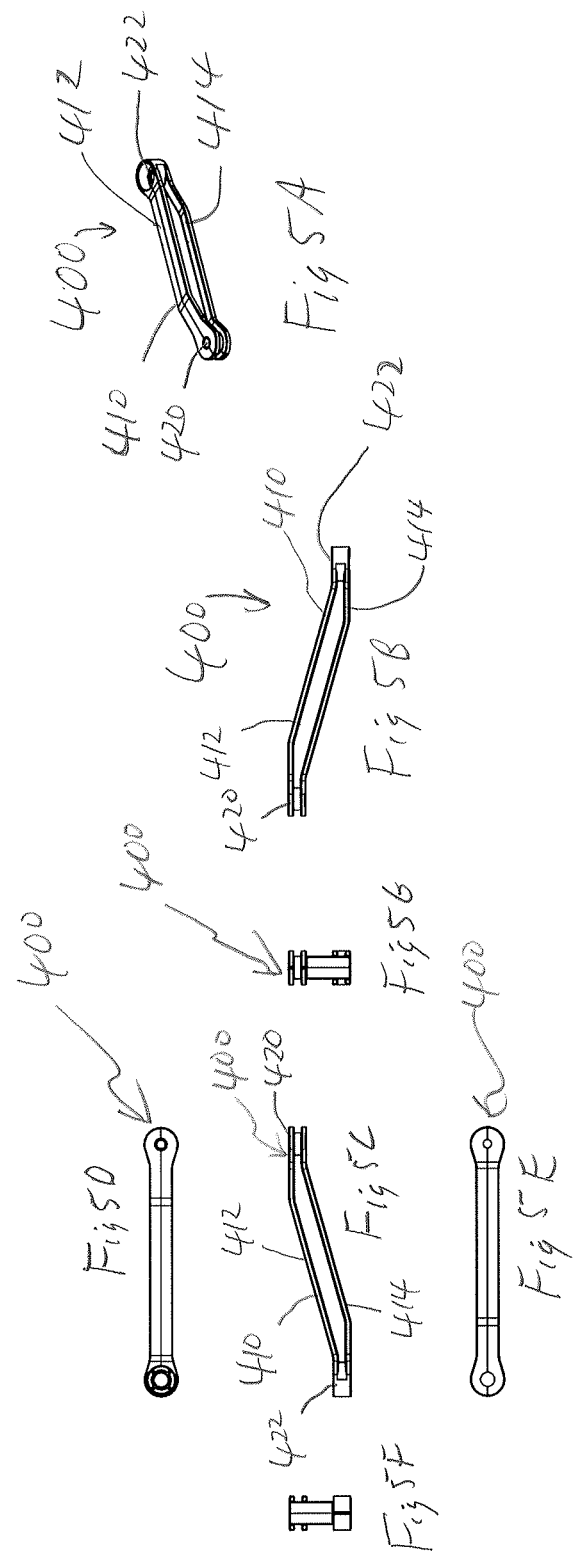

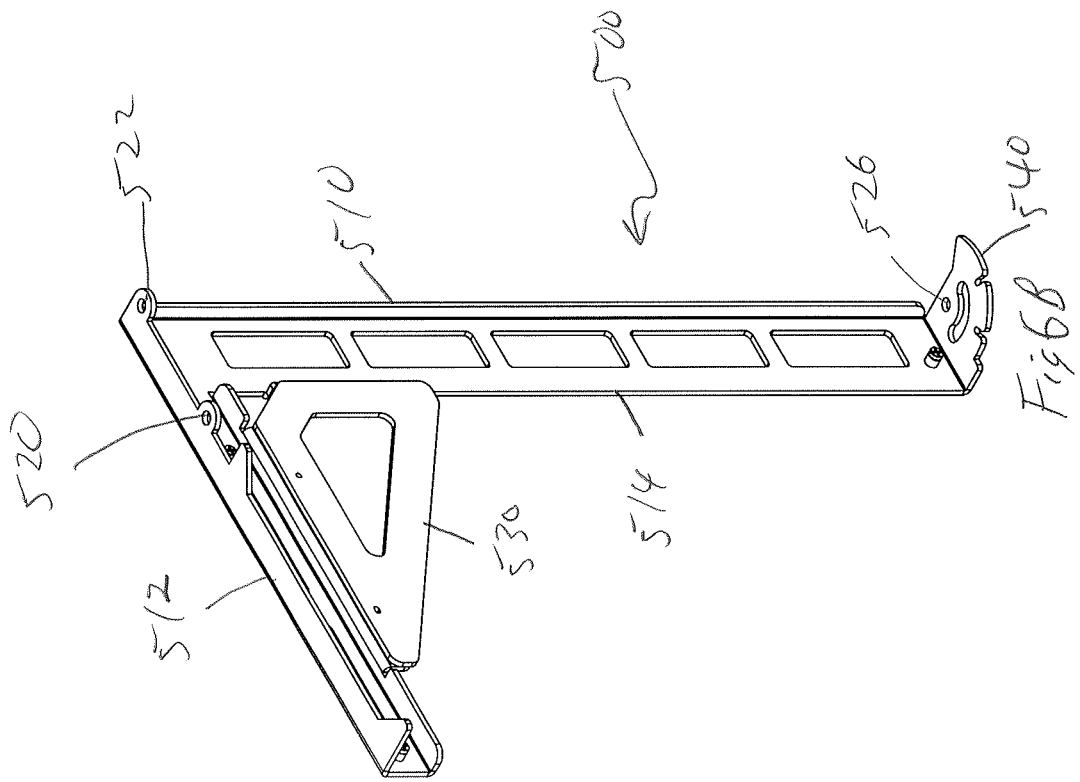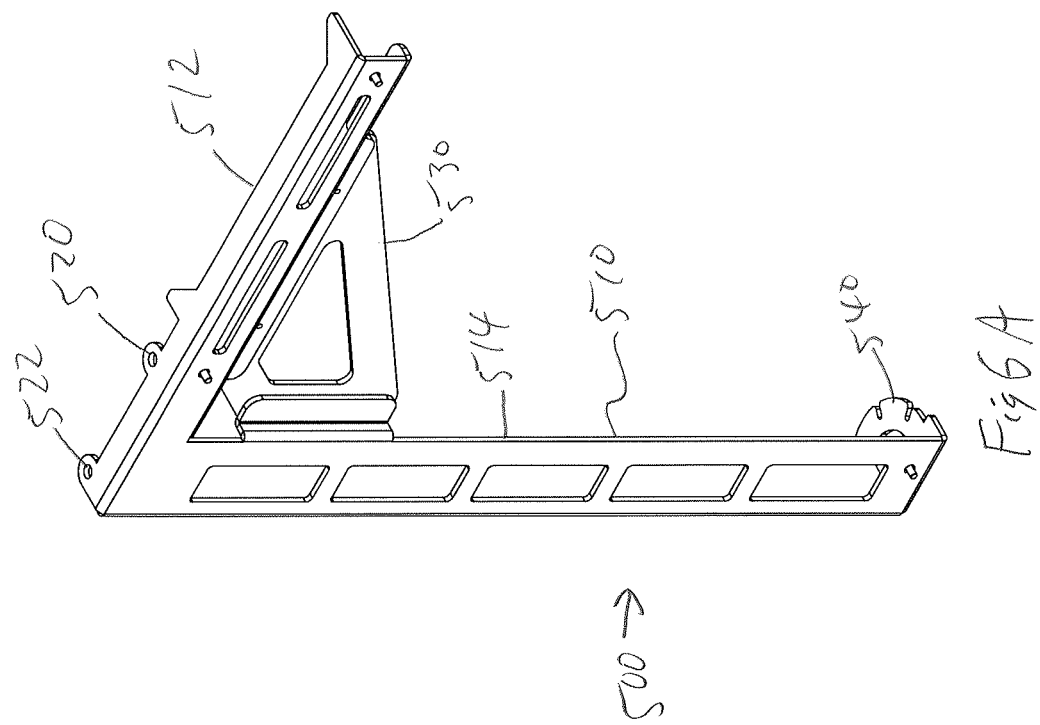

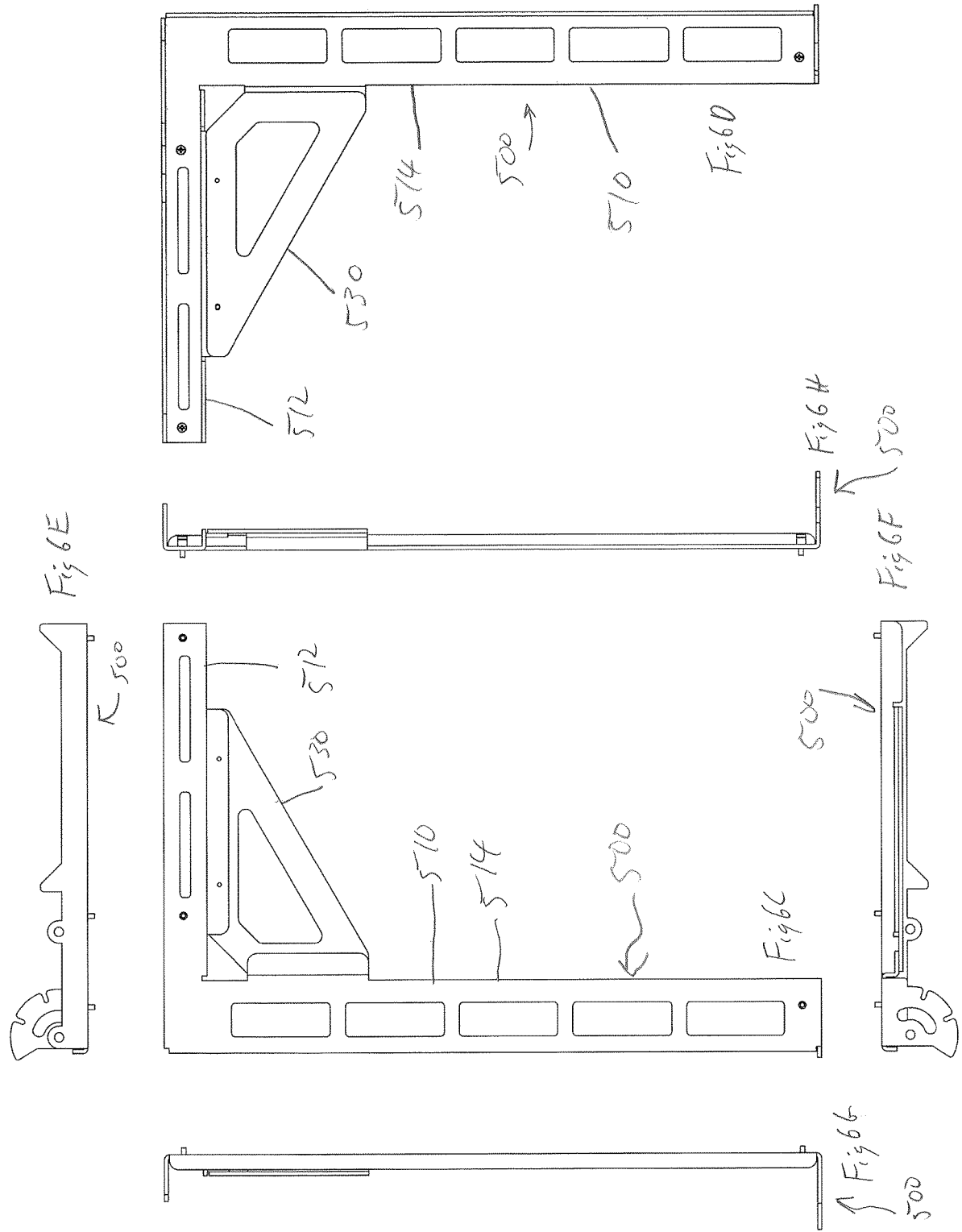

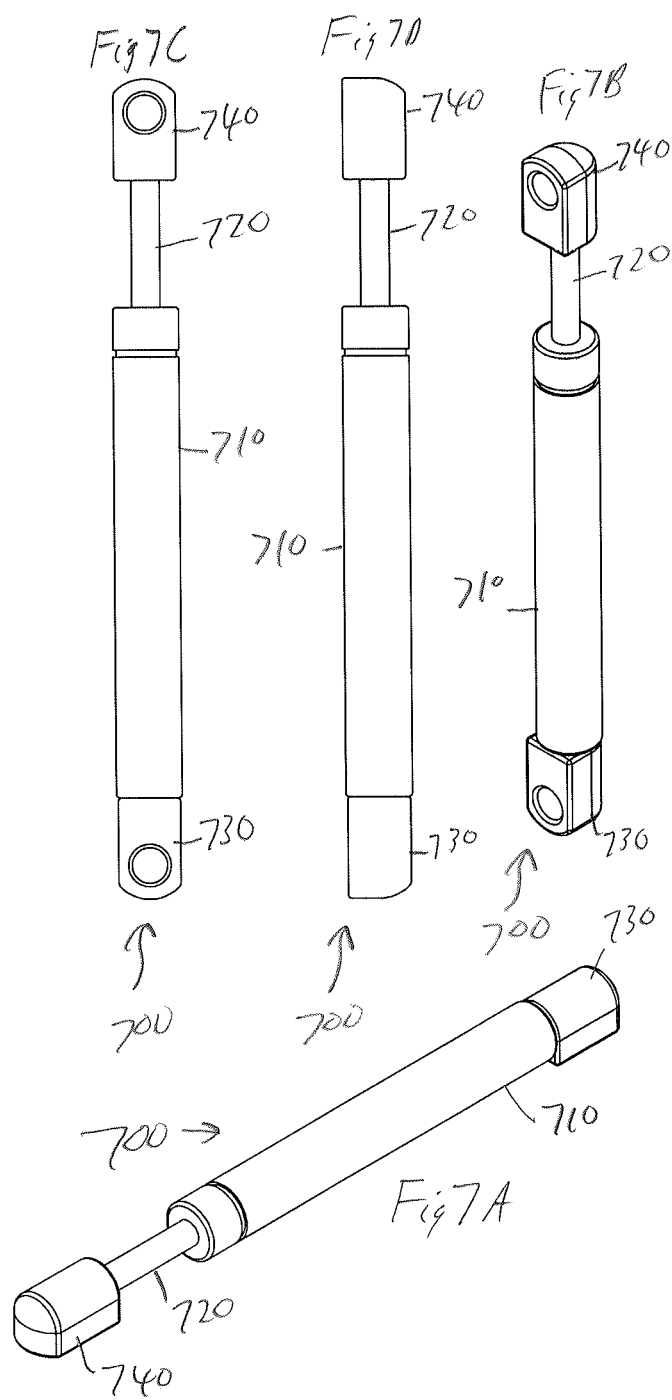

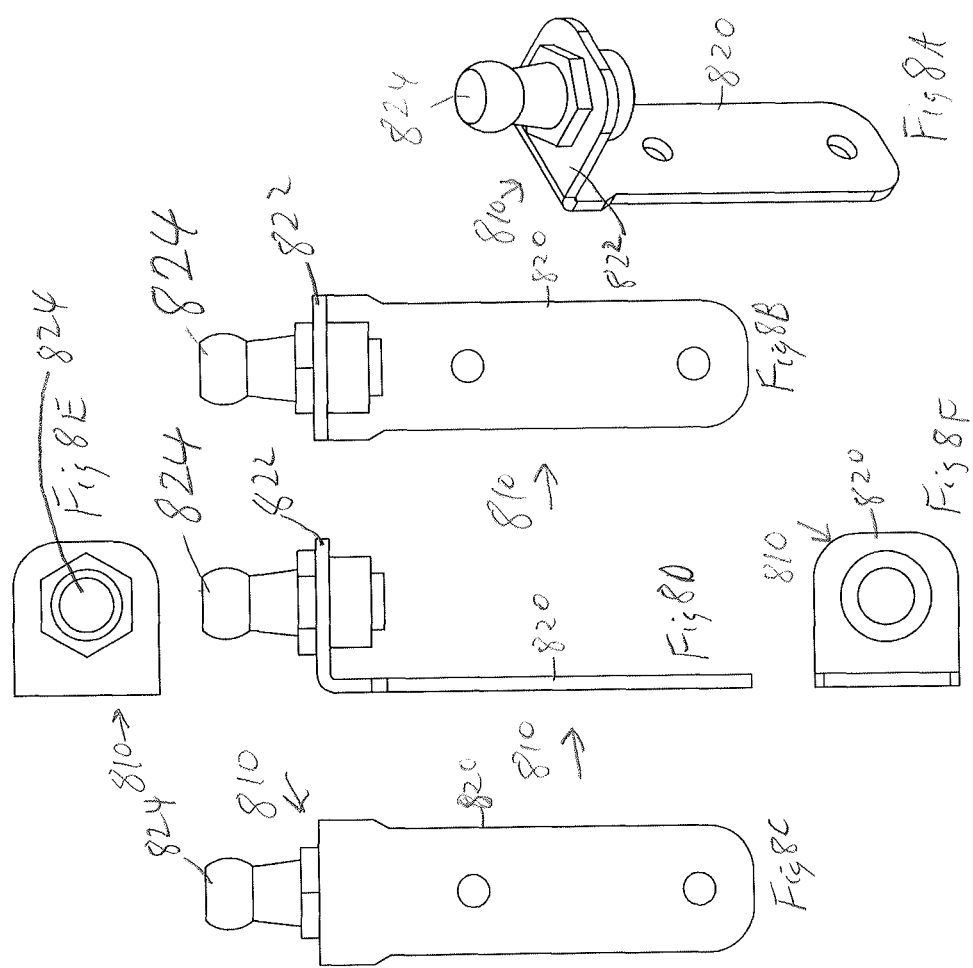

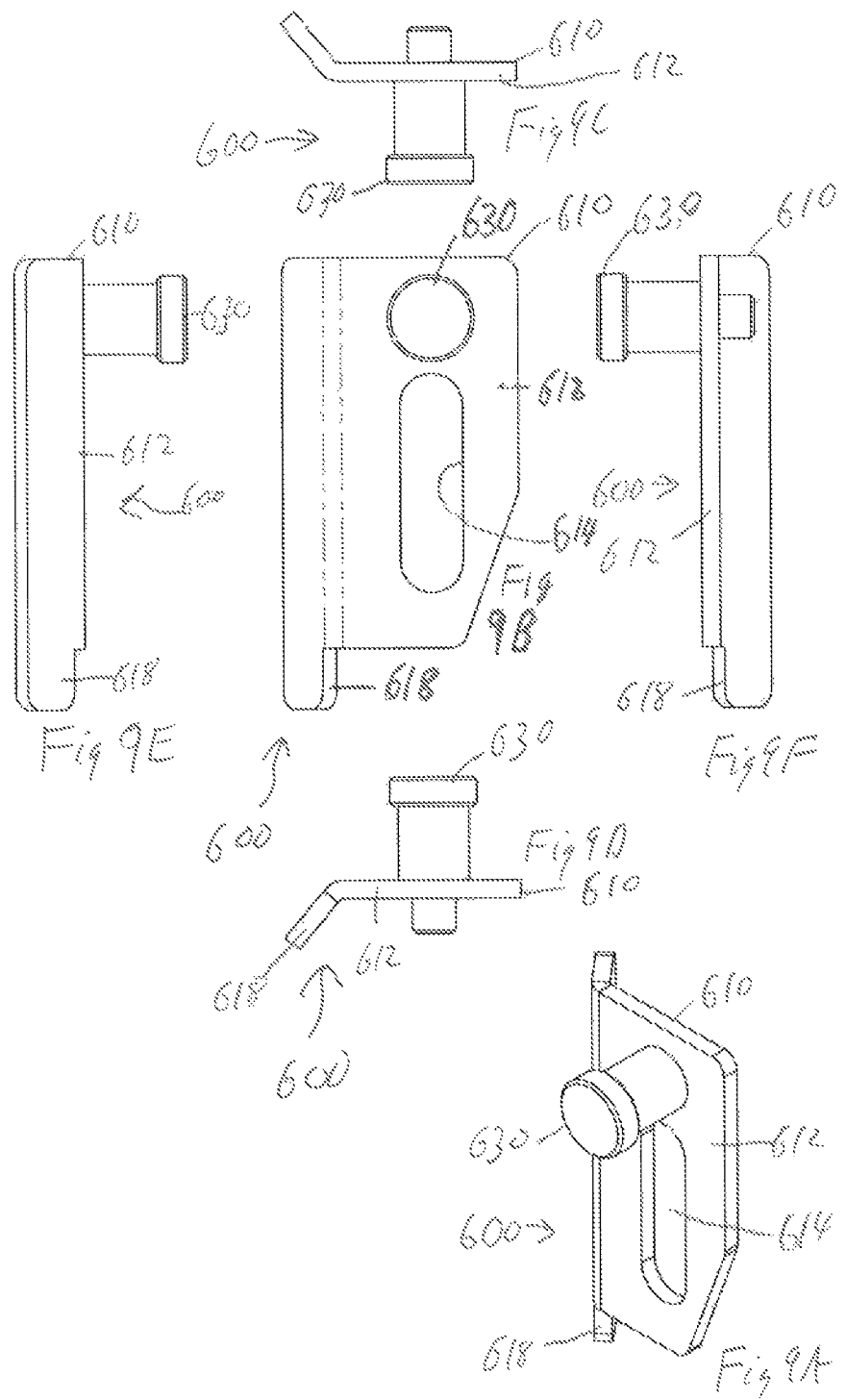

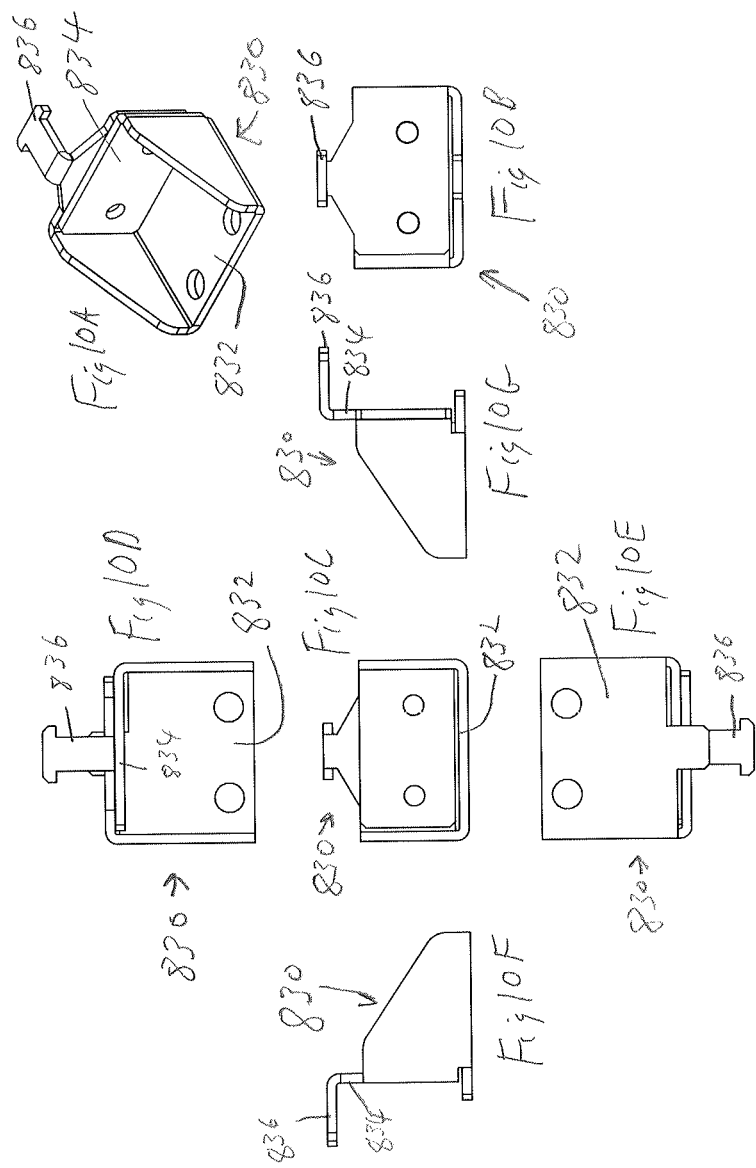

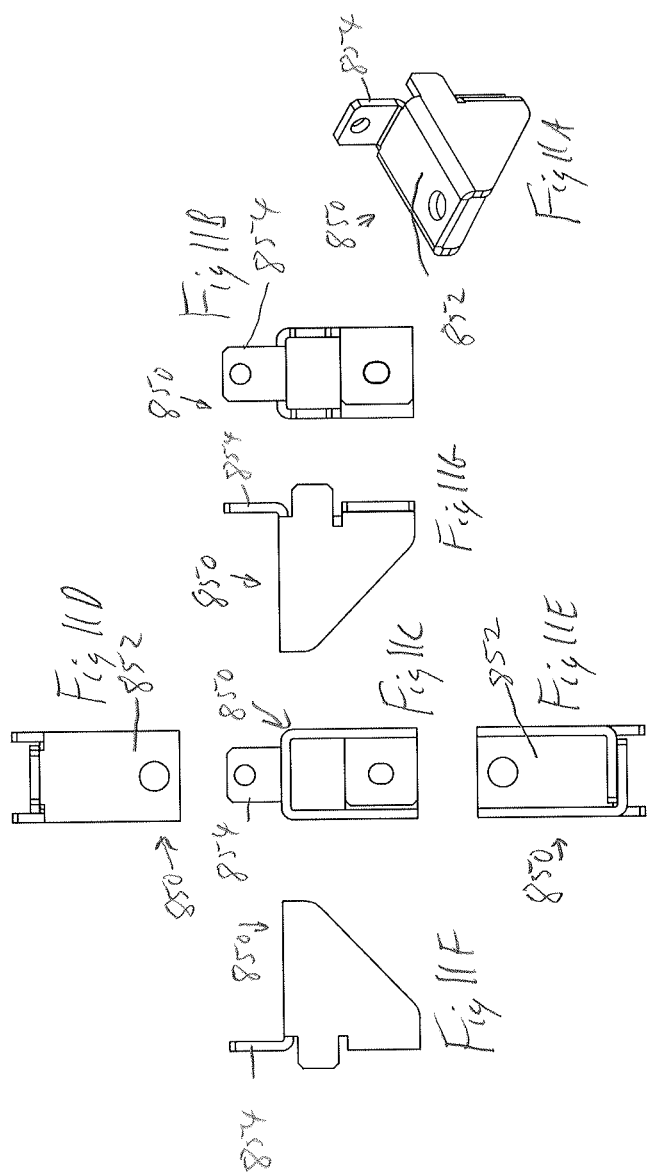

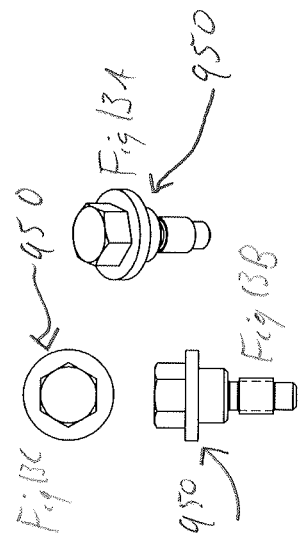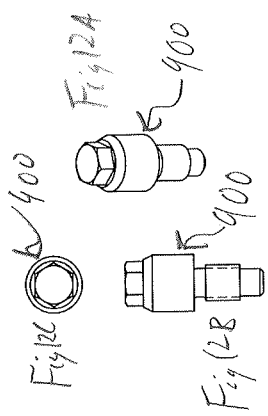

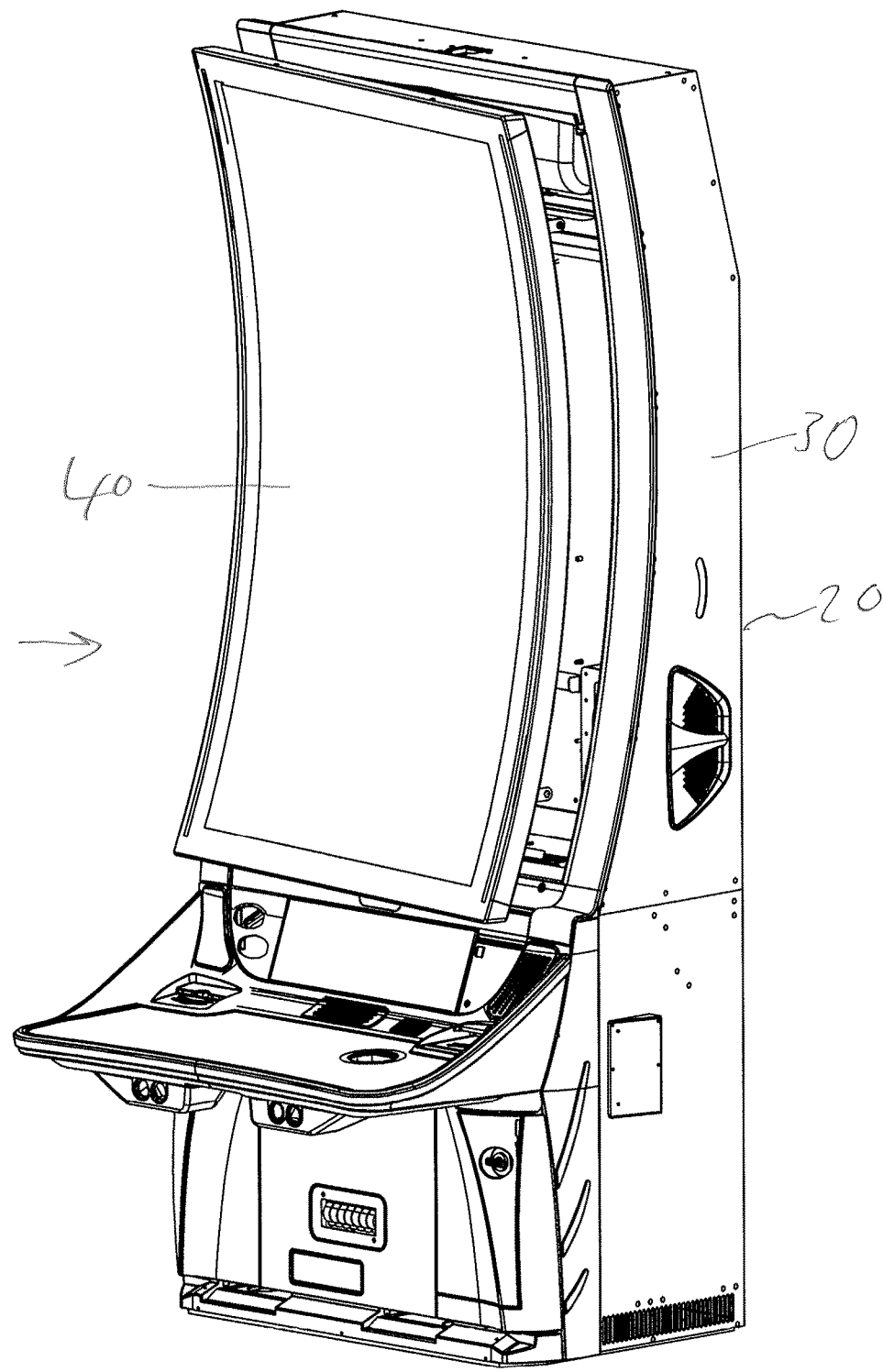

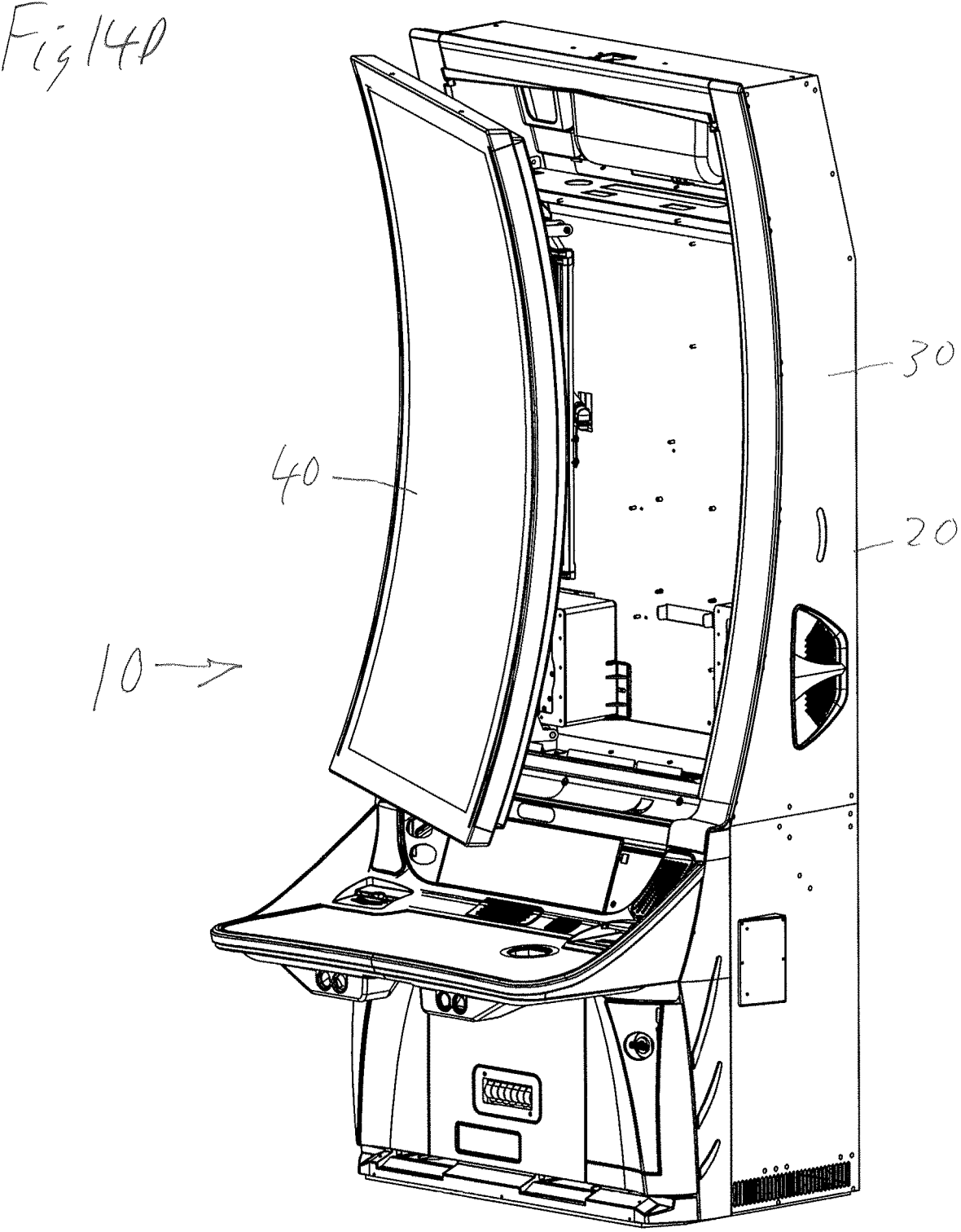

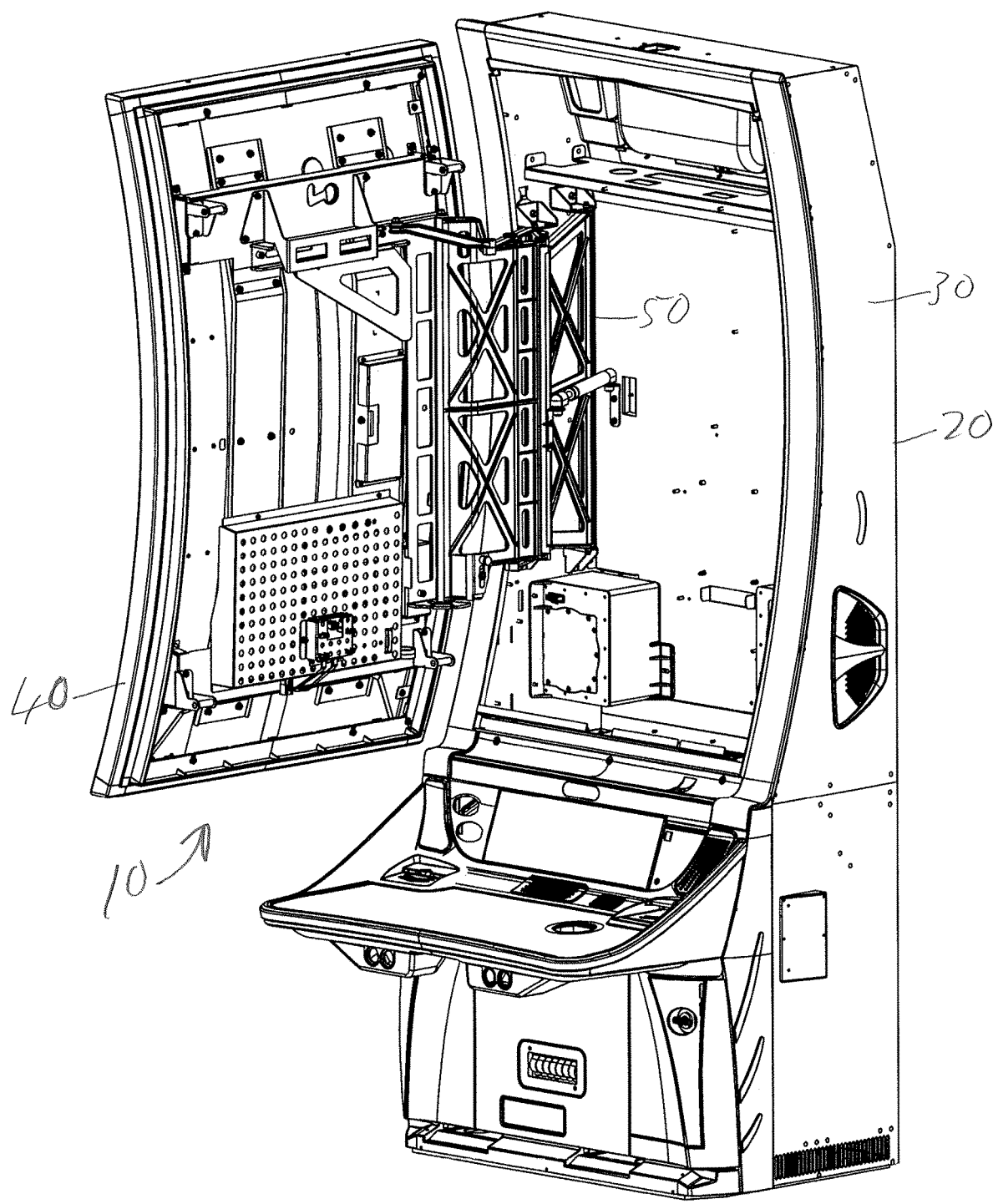

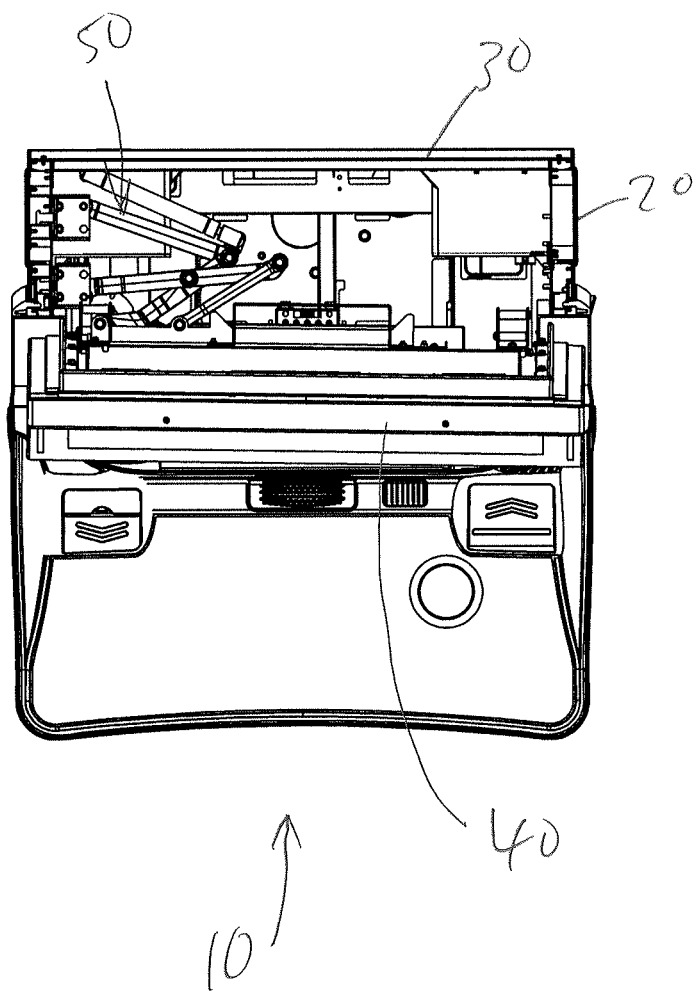

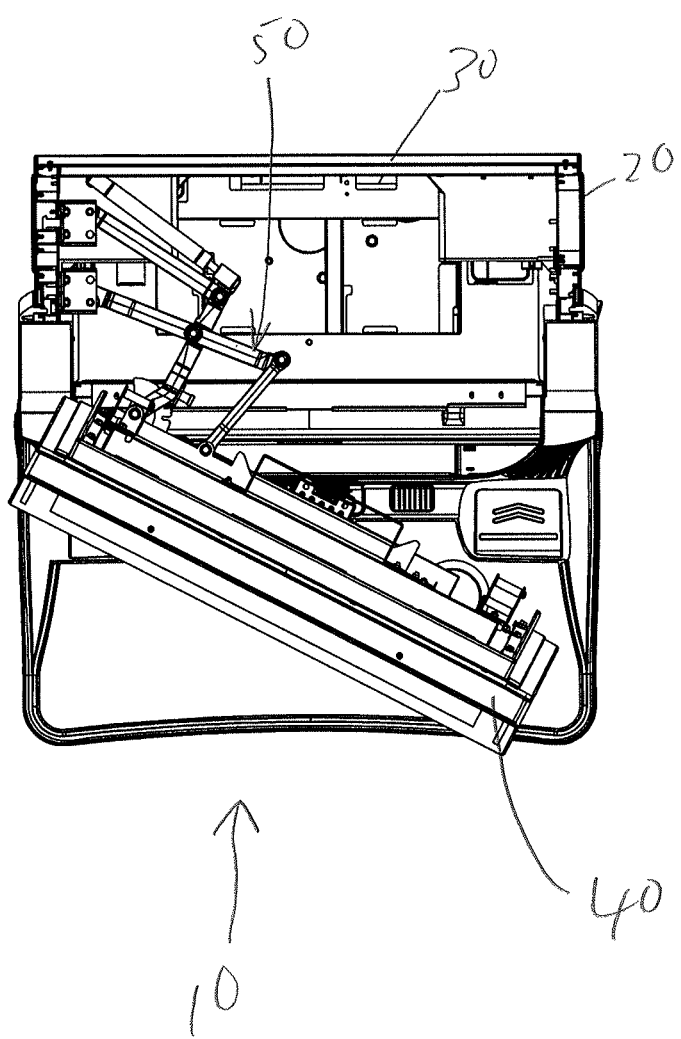

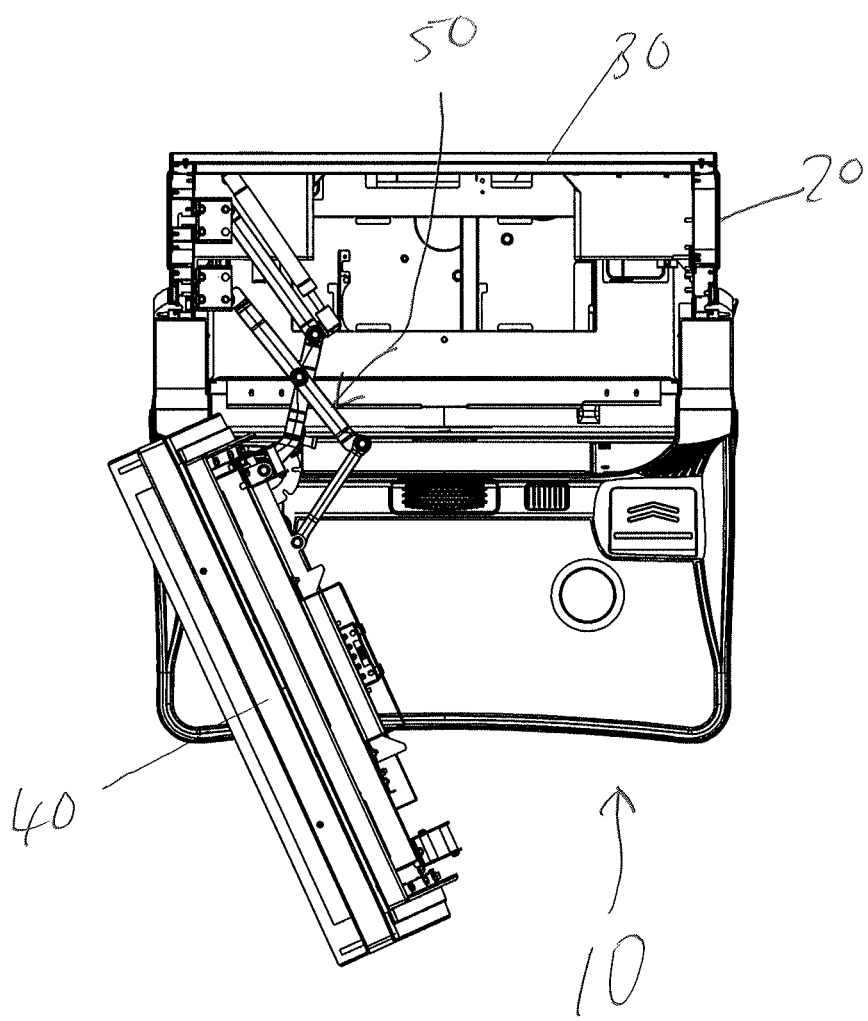

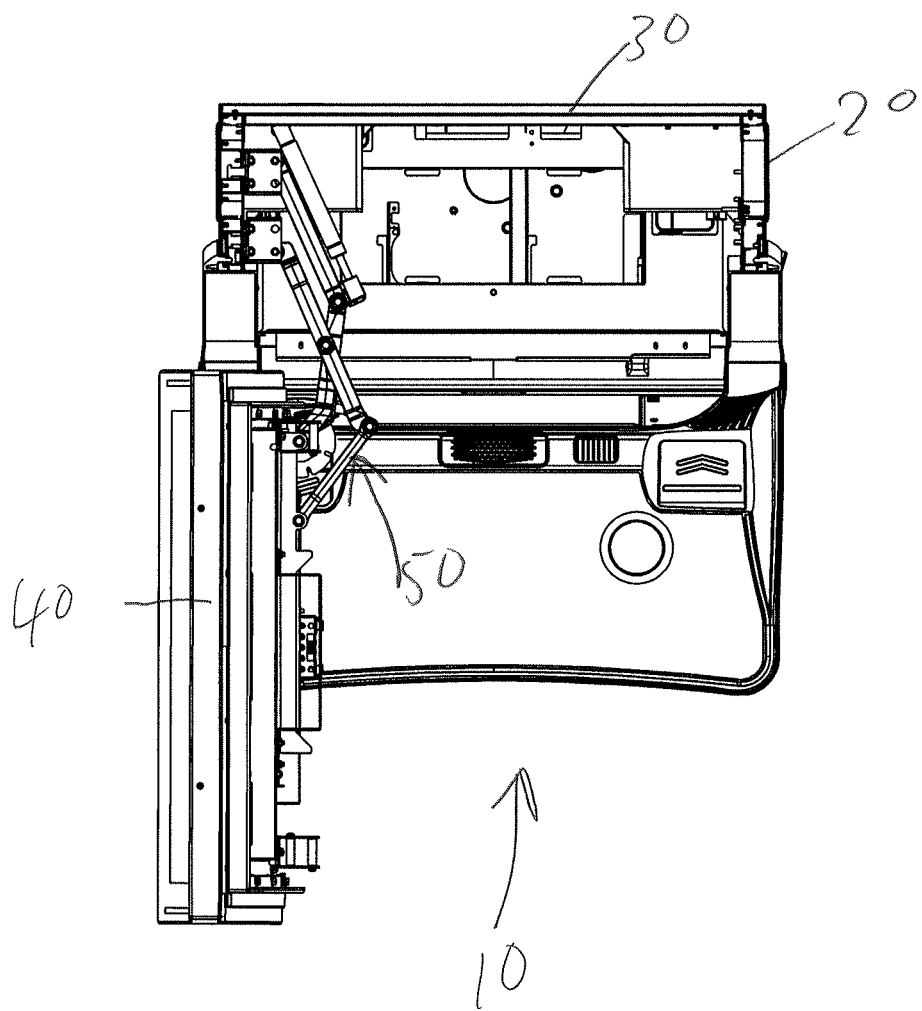

GAMING MACHINE MONITOR HINGE ASSEMBLY

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines that provide players awards in primary games are well known. Gaming machines generally require the player to place or make a wager to activate the primary game. Gaming machines typically determine any award provided to the player based on the primary game outcome including one or more winning symbols or winning symbol combinations and on the amount of the wager. Secondary games are also well known in gaming machines. The secondary games usually provide an additional award or award opportunity to the player. Secondary games usually do not require an additional player wager to be activated.

Gaming machines typically include one or more display devices that display among other things, the primary and secondary games and any associated awards. Various types of display devices have been employed or proposed to be employed in gaming machines including but not limited to mechanical displays (such as reels and wheels) and video monitors (such as television displays, plasma displays, liquid crystal displays (LCDs), displays based on light emitting diodes (LEDs), displays based on a plurality of organic light-emitting diodes (OLEDs), displays based on polymer light-emitting diodes (PLEDs), and displays based on a plurality of surface-conduction electron-emitters (SEDs)). In various known gaming machines, the display device is supported by or mounted in or to an openable door that is attached to the housing of the cabinet of the gaming machine. The door is openable to provide access to the components inside the cabinet.

In recent years, various known gaming machines have been made with a display device in the form of a relatively large curved monitor. One problem that has arisen with gaming machines that have relatively large curved monitors relates to how the relatively large curved monitor is supported by the housing and particularly the door of the cabinet when the monitor extends in a portrait orientation (i.e., the curve of the monitor extends vertically or from top to bottom). More specifically, the problem with such doors that support such large curved monitors relates to being able to open the door in a way that provides full service access inside the cabinet (i.e., in the housing behind the door), while not interfering with a neighboring gaming machine such as a neighboring gaming machine on a 28-inch pitch.

One way to partially address this problem has been implemented in certain known gaming machines. In these known gaming machines, the relatively large curved monitor is supported by a curved door or monitor support that is pivotally hinged to the housing of the cabinet at a top horizontal edge of the door or monitor support (like the back hatch of a minivan). However, these doors or monitor supports typically do not open fully. If they did, the center of gravity could end up too far in front of the gaming machine's stand and cause the gaming machine to tip forward. Thus, this solution does not facilitate full access to the interior components of these gaming machines.

One problem with using a vertically extending hinge for a gaming machine with a door or monitor support that supports a relatively large curved monitor is that the monitor's curve has the effect of making it act like it's very thick. If the door or monitor support that supports the relatively large curved monitor is hinged at the top and bottom corners of the door, the middle of the door or monitor support will swing too far into the housing of the cabinet (in particular, the monitor and housing would need overlapping security flanges and that wouldn't be possible because the back of the door or monitor support would be trying to swing through them). If the door that supports the relatively large curved monitor is hinged at the center, the top and bottom corners of the door would swing very wide of the cabinet and potentially hit a neighboring gaming machine.

Accordingly, there is a need to solve these problems, and particularly a need to provide a gaming machine with a relatively large curved monitor that is attached to the housing of the cabinet and that enables the monitor (and the door or monitor support) to open a full 90 degrees while keeping the monitor (and the door or monitor support) close to the housing of the cabinet.

SUMMARY

In various embodiments, the present disclosure relates generally to gaming machine monitor hinge assembly that solves the above problems. Various embodiments of the present disclosure also provide a gaming machine having a relatively large curved monitor and a monitor hinge assembly that connects the monitor to the housing of the cabinet in a way that solves the above problems. The gaming machine monitor hinge assembly of the present disclosure may be implemented in connection with any gaming machines such as, but not limited to, slot gaming machines, video poker gaming machines, video lottery terminals (VLT) or gaming machines, video keno gaming machines, or video bingo gaming machines. The hinge assembly of the present disclosure may be also be implemented in other types of machines, such as machines that support a curved monitor, other curved device, or other device.

The gaming machine monitor hinge assembly of various embodiments of the present disclosure generally includes: (a) a first pivotable linkage; (b) a second pivotable linkage; (c) a third pivotable linkage; (d) a fourth pivotable linkage; (e) a monitor mount; (f) a locking catch; (g) a damper; (h) a plurality of mounting brackets; and (i) a plurality of attachment mechanisms. The first pivotable linkage, the second pivotable linkage, the third pivotable linkage, the fourth pivotable linkage, and the monitor mount are configured, arranged, and attached to each other and the interior of the housing of the cabinet of the gaming machine such that they enable the hinge assembly to move from a closed position to a plurality of partially open positions to a fully open position as further described herein. The gaming machine monitor hinge assembly is configured to first primarily move the monitor (or the monitor support such as a door) outwardly from the housing of the cabinet of the gaming machine (while at most slightly rotating the monitor) and then primarily rotate the monitor (or monitor support) relative to the housing (while continuing to move the monitor outwardly at a slower rate or pace). The gaming machine monitor hinge assembly of the present disclosure thus provides a compound motion for the monitor (or monitor support) as it opens. In particular, the gaming machine monitor hinge assembly of the present disclosure first primarily moves the monitor outwardly from the housing, more or less linearly to clear any security flanges and latching mechanisms of the housing of the cabinet. The gaming machine monitor hinge assembly then keeps moving the monitor outwardly enough for the middle of the monitor (or monitor support) to not swing into the housing. This part of the motion may be less linear and more rotational. The gaming machine monitor hinge assembly then rotates the monitor (or monitor support) to a full 90 degrees within the footprint of the gaming machine stand such as a standard 28-inch width of the stand, thus solving the above described problems with mounting a relatively large curved monitor to a housing of a cabinet of a gaming machine.

In various embodiments of the present disclosure discussed herein, the compound opening motion of "mostly-translate-changing-to-mostly-rotate" when opening the hinge assembly as well as the opposite motion when closing the hinge assembly happens automatically. That is, a person with no knowledge of how the hinge operates can open and close the hinge or the object such as the monitor or monitor support supported by the hinge successfully.

The damper of the gaming machine monitor hinge assembly is configured, arranged, and attached to the first pivotable linkage and the interior of the housing of the cabinet of the gaming machine to prevent the monitor (or monitor support) from closing too quickly. It should be appreciated that in other embodiments of the present disclosure, the hinge assembly does not include such a damper. It should also be appreciated that in other embodiments of the present disclosure, the damper may be attached to other linkages or between linkages.

The locking catch of the gaming machine monitor hinge assembly is configured, arranged, and attached to the third pivotable linkage such that it enables a person who services the gaming machine to lock the hinge assembly in at least one of the open positions such as the fully open position to enable such person to service interior components of the gaming machine. It should be appreciated that in other embodiments of the present disclosure, the hinge assembly does not include such a locking catch.

Additional features and advantages are described in, and will be apparent from, the following Detailed Description and the figures.

BRIEF DESCRIPTION OF THE FIGURES

FIG. 1A is a top rear perspective view of one example embodiment of the gaming machine monitor hinge assembly of the present disclosure.

FIG. 1B is a bottom perspective view of the gaming machine monitor hinge assembly of FIG. 1A.

FIG. 1C is a top view of the gaming machine monitor hinge assembly of FIG. 1A, shown in a fully closed position.

FIG. 1D is a top view of the gaming machine monitor hinge assembly of FIG. 1A, shown in a first partially open position.

FIG. 1E is a top view of the gaming machine monitor hinge assembly of FIG. 1A, shown in a second further partially open position.

FIG. 1F is a top view of the gaming machine monitor hinge assembly of FIG. 1A, shown in a third further partially open position.

FIG. 1G is a top view of the gaming machine monitor hinge assembly of FIG. 1A, shown in a fourth further partially open position.

FIG. 1H is a top view of the gaming machine monitor hinge assembly of FIG. 1A, shown in a fully open position.

FIG. 2A is a rear perspective view of the first pivotable linkage of the gaming machine monitor hinge assembly of FIG. 1A.

FIG. 2B is a rear view of the first pivotable linkage of the gaming machine monitor hinge assembly of FIG. 1A.

FIG. 2C is a front view of the first pivotable linkage of the gaming machine monitor hinge assembly of FIG. 1A.

FIG. 2D is a top view of the first pivotable linkage of the gaming machine monitor hinge assembly of FIG. 1A.

FIG. 2E is a bottom view of the first pivotable linkage of the gaming machine monitor hinge assembly of FIG. 1A.

FIG. 2F is a left end view of the first pivotable linkage of the gaming machine monitor hinge assembly of FIG. 1A.

FIG. 2G is a right end view of the first pivotable linkage of the gaming machine monitor hinge assembly of FIG. 1A.

FIG. 3A is a rear perspective view of the second pivotable linkage of the gaming machine monitor hinge assembly of FIG. 1A.

FIG. 3B is a rear view of the second pivotable linkage of the gaming machine monitor hinge assembly of FIG. 1A.

FIG. 3C is a front view of the second pivotable linkage of the gaming machine monitor hinge assembly of FIG. 1A.

FIG. 3D is a top view of the second pivotable linkage of the gaming machine monitor hinge assembly of FIG. 1A.

FIG. 3E is a bottom view of the second pivotable linkage of the gaming machine monitor hinge assembly of FIG. 1A.

FIG. 3F is a left end view of the second pivotable linkage of the gaming machine monitor hinge assembly of FIG. 1A.

FIG. 3G is a right end view of the second pivotable linkage of the gaming machine monitor hinge assembly of FIG. 1A.

FIG. 4A is a rear perspective view of the third pivotable linkage of the gaming machine monitor hinge assembly of FIG. 1A.

FIG. 4B is a rear view of the third pivotable linkage of the gaming machine monitor hinge assembly of FIG. 1A.

FIG. 4C is a front view of the third pivotable linkage of the gaming machine monitor hinge assembly of FIG. 1A.

FIG. 4D is a top view of the third pivotable linkage of the gaming machine monitor hinge assembly of FIG. 1A.

FIG. 4E is a bottom view of the third pivotable linkage of the gaming machine monitor hinge assembly of FIG. 1A.

FIG. 4F is a left end view of the third pivotable linkage of the gaming machine monitor hinge assembly of FIG. 1A.

FIG. 4G is a right end view of the third pivotable linkage of the gaming machine monitor hinge assembly of FIG. 1A.

FIG. 5A is a rear perspective view of the fourth pivotable linkage of the gaming machine monitor hinge assembly of FIG. 1A.

FIG. 5B is a rear view of the fourth pivotable linkage of the gaming machine monitor hinge assembly of FIG. 1A.

FIG. 5C is a front view of the fourth pivotable linkage of the gaming machine monitor hinge assembly of FIG. 1A.

FIG. 5D is a top view of the fourth pivotable linkage of the gaming machine monitor hinge assembly of FIG. 1A.

FIG. 5E is a bottom view of the fourth pivotable linkage of the gaming machine monitor hinge assembly of FIG. 1A.

FIG. 5F is a left end view of the fourth pivotable linkage of the gaming machine monitor hinge assembly of FIG. 1A.

FIG. 5G is a right end view of the fourth pivotable linkage of the gaming machine monitor hinge assembly of FIG. 1A.

FIG. 6A is a front perspective view of the monitor mount of the gaming machine monitor hinge assembly of FIG. 1A.

FIG. 6B is a rear perspective view of the monitor mount of the gaming machine monitor hinge assembly of FIG. 1A.

FIG. 6C is a front view of the monitor mount of the gaming machine monitor hinge assembly of FIG. 1A.

FIG. 6D is a rear view of the monitor mount of the gaming machine monitor hinge assembly of FIG. 1A.

FIG. 6E is a top view of the monitor mount of the gaming machine monitor hinge assembly of FIG. 1A.

FIG. 6F is a bottom view of the monitor mount of the gaming machine monitor hinge assembly of FIG. 1A.

FIG. 6G is a left end view of the monitor mount of the gaming machine monitor hinge assembly of FIG. 1A.

FIG. 6H is a right end view of the monitor mount of the gaming machine monitor hinge assembly of FIG. 1A.

FIG. 7A is a rear perspective view of the damper of the gaming machine monitor hinge assembly of FIG. 1A.

FIG. 7B is a bottom perspective view of the damper of the gaming machine monitor hinge assembly of FIG. 1A.

FIG. 7C is a bottom view of the damper of the gaming machine monitor hinge assembly of FIG. 1A.

FIG. 7D is a rear view of the damper of the gaming machine monitor hinge assembly of FIG. 1A.

FIG. 8A is a rear perspective view of the damper mount of the gaming machine monitor hinge assembly of FIG. 1A.

FIG. 8B is a front view of the damper mount of the gaming machine monitor hinge assembly of FIG. 1A.

FIG. 8C is a rear view of the damper mount of the gaming machine monitor hinge assembly of FIG. 1A.

FIG. 8D is a left side view of the damper mount of the gaming machine monitor hinge assembly of FIG. 1A.

FIG. 8E is a top view of the damper mount of the gaming machine monitor hinge assembly of FIG. 1A.

FIG. 8F is a bottom view of the damper mount of the gaming machine monitor hinge assembly of FIG. 1A.

FIG. 9A is a rear perspective view of the lockout catch of the gaming machine monitor hinge assembly of FIG. 1A.

FIG. 9B is a rear view of the lockout catch of the gaming machine monitor hinge assembly of FIG. 1A.

FIG. 9C is a top view of the lockout catch of the gaming machine monitor hinge assembly of FIG. 1A.

FIG. 9D is a bottom view of the lockout catch of the gaming machine monitor hinge assembly of FIG. 1A.

FIG. 9E is a right side view of the lockout catch of the gaming machine monitor hinge assembly of FIG. 1A.

FIG. 9F is a left side view of the lockout catch of the gaming machine monitor hinge assembly of FIG. 1A.

FIG. 10A is a front perspective view of the upper hinge mount of the gaming machine monitor hinge assembly of FIG. 1A.

FIG. 10B is a rear view of the upper hinge mount of the gaming machine monitor hinge assembly of FIG. 1A.

FIG. 10C is a front view of the upper hinge mount of the gaming machine monitor hinge assembly of FIG. 1A.

FIG. 10D is a top view of the upper hinge mount of the gaming machine monitor hinge assembly of FIG. 1A.

FIG. 10E is a bottom view of the upper hinge mount of the gaming machine monitor hinge assembly of FIG. 1A.

FIG. 10F is a left side view of the upper hinge mount of the gaming machine monitor hinge assembly of FIG. 1A.

FIG. 10G is a right side view of the upper hinge mount of the gaming machine monitor hinge assembly of FIG. 1A.

FIG. 11A is a front perspective view of the lower hinge mount of the gaming machine monitor hinge assembly of FIG. 1A.

FIG. 11B is a rear view of the lower hinge mount of the gaming machine monitor hinge assembly of FIG. 1A.

FIG. 11C is a front view of the lower hinge mount of the gaming machine monitor hinge assembly of FIG. 1A.

FIG. 11D is a top view of the lower hinge mount of the gaming machine monitor hinge assembly of FIG. 1A.

FIG. 11E is a bottom view of the lower hinge mount of the gaming machine monitor hinge assembly of FIG. 1A.

FIG. 11F is a left side view of the lower hinge mount of the gaming machine monitor hinge assembly of FIG. 1A.

FIG. 11G is a right side end view of the lower hinge mount of the gaming machine monitor hinge assembly of FIG. 1A.

FIG. 12A is a front perspective view of the hinge pin of the gaming machine monitor hinge assembly of FIG. A1.

FIG. 12B is a side view of the hinge pin mount of the gaming machine monitor hinge assembly of FIG. 1A.

FIG. 12C is a top view of the hinge pin of the gaming machine monitor hinge assembly of FIG. 1A.

FIG. 13A is a front perspective view of the shoulder screw of the gaming machine monitor hinge assembly of FIG. 1A.

FIG. 13B is a side view of the shoulder screw mount of the gaming machine monitor hinge assembly of FIG. 1A.

FIG. 13C is a top view of the shoulder screw of the gaming machine monitor hinge assembly of FIG. 1A.

FIG. 14C is a front perspective view of the gaming machine of FIG. 14A, with the hinge assembly and the monitor in a further partially open position where the monitor has moved further outwardly from the housing and has slightly rotated.

FIG. 14D is a front perspective view of the gaming machine of FIG. 14A, with the hinge assembly and the monitor in a still further partially open position where the monitor has moved slightly further outwardly from the housing and has substantially rotated.

FIG. 14F is a front perspective view of the gaming machine of FIG. 14A, with the hinge assembly and the monitor in a fully open position where the monitor has moved slightly further outwardly from the housing and substantially rotated to a 90 degree orientation relative to the housing.

FIG. 15B is a top view of a gaming machine of FIG. 14A (shown with part of the top of the housing removed), with the hinge assembly and the monitor in an initial partially open position where the monitor has moved outwardly from the housing.

FIG. 15D is a top view of a gaming machine of FIG. 14A (shown with part of the top of the housing removed), with the hinge assembly and the monitor in a still further partially open position where the monitor has moved slightly further outwardly from the housing and has substantially rotated.

FIG. 15E is a top view of a gaming machine of FIG. 14A (shown with part of the top of the housing removed), with the hinge assembly and the monitor in an even further partially open position where the monitor has moved slightly further outwardly from the housing and has further substantially rotated.

FIG. 15F is a top view of a gaming machine of FIG. 14A (shown with part of the top of the housing removed), with the hinge assembly and the monitor in a fully open position where the monitor has moved slightly further outwardly from the housing and substantially rotated to a 90 degree orientation relative to the housing.

DETAILED DESCRIPTION

Figure 14A:
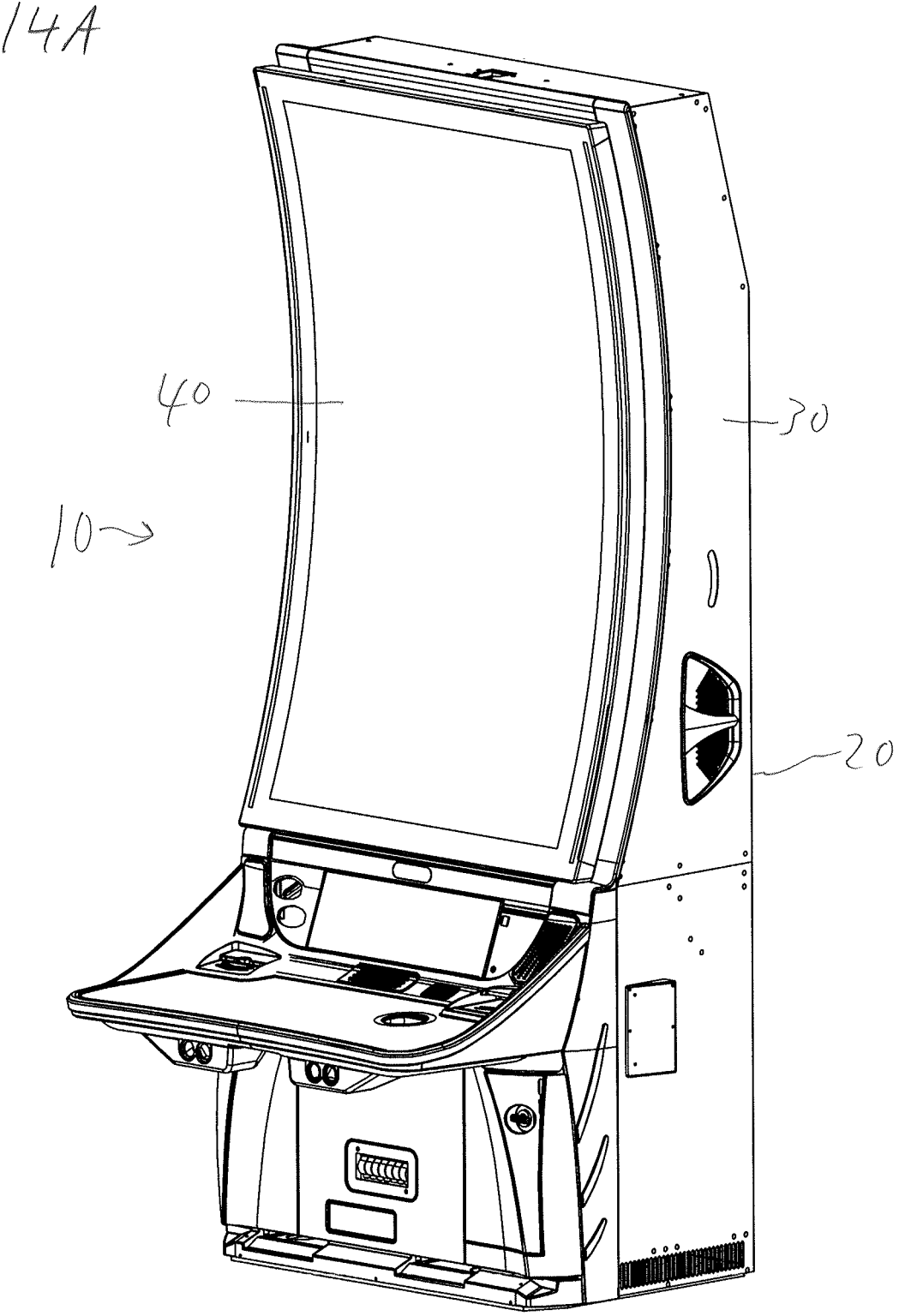
FIG. 14A is a front perspective view of a gaming machine of one example embodiment of the present disclosure, wherein the gaming machine includes a cabinet having a housing, a relatively large curved monitor, and the monitor hinge assembly of FIG. 1A, wherein the hinge assembly supports the relatively large curved monitor, and showing the hinge assembly and the monitor in the fully closed position.
Figure 14B:
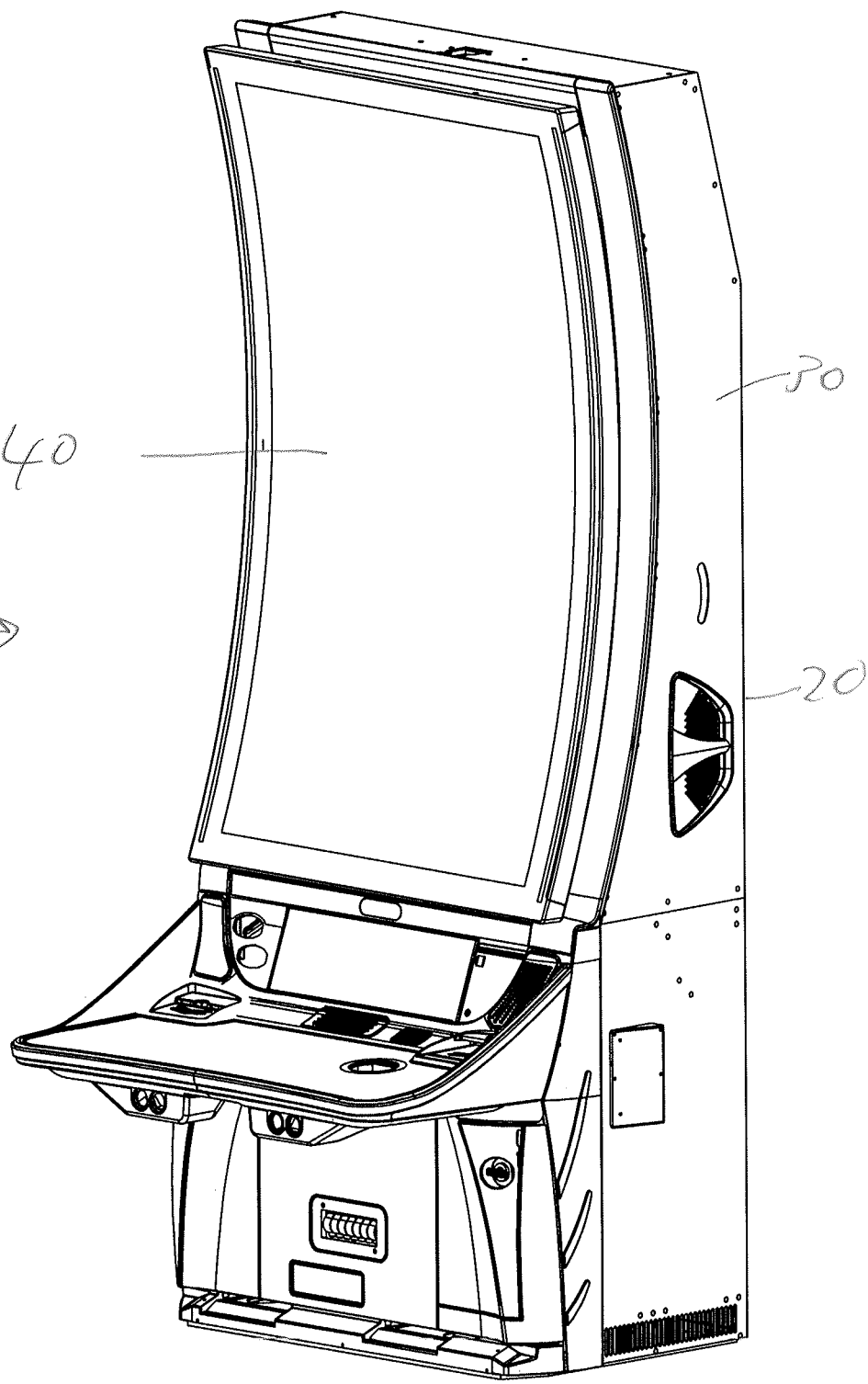
FIG. 14B is a front perspective view of the gaming machine of FIG. 14A, with the hinge assembly and the monitor in an initial partially open position where the monitor has moved outwardly from the housing.

In various embodiments, the present disclosure relates generally to a gaming machine monitor hinge assembly configured to movably and pivotally attach a relatively large curved monitor to a housing of a cabinet of a gaming machine. In various embodiments, the present disclosure relates generally to a gaming machine having a monitor hinge assembly configured to movably and pivotally attach a relatively large curved monitor to a housing of a cabinet of the gaming machine.

Referring now to FIGS. 1A to 15F, the gaming machine monitor hinge assembly of one example embodiment of the present disclosure is generally illustrated and indicated by numeral 50. The gaming machine monitor hinge assembly may sometimes be referred to herein for brevity as the monitor hinge assembly or the hinge assembly. The gaming machine monitor hinge assembly 50 of this illustrated example embodiment as shown in FIGS. 1A to 13C generally includes: (a) a first pivotable linkage 100; (b) a second pivotable linkage 200; (c) a third pivotable linkage 300; (d) a fourth pivotable linkage 400; (e) a monitor mount 500; (f) a locking catch 600; (g) a damper 700; (h) a plurality of mounting brackets; and (i) a plurality of attachment mechanisms. The gaming machine monitor hinge assembly 50 of this illustrated example embodiment as shown in FIGS. 1A to 13C is configured to be employed in a gaming machine such as the gaming machine 10 shown in FIGS. 14A to 15F. This example gaming machine 10 includes a cabinet 20 having a housing 30 and a relatively large curved monitor 40. The housing 30 includes a back wall, a left side wall, a right side wall, a top wall, and a bottom wall that define an interior space in the housing for components of the gaming machine 10. The housing 30 and the monitor 40 together are part of the entire cabinet 20 of the gaming machine 10. The monitor 40 can be positioned in a monitor support such as a door. For purposes of this disclosure the monitor and the monitor support may be referred to simply as the monitor.

As partially shown in FIGS. 1A, 1B, 1C, 1D, 1E, 1F, 1G, and 1H, in this illustrated example embodiment: (i) the first pivotable linkage 100 is pivotally connected to the upper and lower mounting brackets (described below) that are configured to be attached to the interior side wall of the housing 30 of the cabinet 20 of the gaming machine 10; (ii) the first pivotable linkage 100 is pivotally connected to the third pivotal linkage 300; (iii) the second pivotable linkage 200 is pivotally connected to the upper and lower mounting brackets (described below) that are configured to be attached to the interior side wall of the housing 30 of the cabinet 20 of the gaming machine 10; (iv) the second pivotable linkage 200 is pivotally connected to the third pivotal linkage 300; (v) the second pivotable linkage 200 is pivotally connected to the fourth pivotal linkage 400; (vi) the third pivotable linkage 300 is pivotally connected to the first pivotable linkage 100; (vii) the third pivotable linkage 300 is pivotally connected to the second pivotal linkage 200; (viii) the third pivotable linkage 300 is pivotally connected to the monitor mount 500; (ix) the fourth pivotable linkage 400 is pivotally connected to the third pivotable linkage 300; (x) the fourth pivotable linkage 400 is pivotally connected to the monitor mount 500; (xi) the monitor mount 500 is pivotally connected to third pivotable linkage 300; (xii) the monitor mount 500 is pivotally connected to fourth pivotable linkage 400; (xiii) the monitor mount 500 is fixedly connected to the back of the monitor or frame or door that supports the relatively large curved monitor 40; (xiv) the locking catch 600 is slidably connected to the third pivotable linkage 300; (xv) the damper 700 is pivotally connected to the damper mount that is configured to be attached to the interior back wall of the housing 30 of the cabinet 20 of the gaming machine 10; and (xvi) the damper 700 is pivotally connected to back of the first pivotable linkage 100.

The first pivotable linkage 100, the second pivotable linkage 200, the third pivotable linkage 300, the fourth pivotable linkage 400, and the monitor mount 500 are configured, arranged, and attached to each other and the interior of the housing 30 of the cabinet 20 of the gaming machine 10 such that they enable the hinge assembly to move from a closed position (shown in FIG. 1C) to a plurality of partially open positions (such as the partially open positions shown in FIGS. 1D, 1E, 1F, and 1G) to a fully open position (shown in FIG. 1H). More specifically, FIG. 1C shows the hinge assembly 50 in the closed position. In this closed position the monitor mount 500 extends parallel to the housing of the cabinet of the gaming machine (not shown in FIG. 1C). FIG. 1D shows the hinge assembly 50 in a partially open position. In this position, the hinge assembly 50 has moved the monitor mount 500 (any attached monitor) primarily outwardly from the housing of the cabinet of the gaming machine and has at most provided a relatively small amount of rotation of the monitor mount 500 relative to the housing. FIG. 1E shows the hinge assembly 50 in a further partially open position. In this position, the hinge assembly 50 has continued to move the monitor mount 500 (any any attached monitor) primarily outwardly from the housing of the cabinet of the gaming machine and has still at most provided a relatively small amount of rotation of the monitor mount 500 relative to the housing. FIG. 1F shows the hinge assembly 50 in further partially open position. In this position, the hinge assembly 50 has continued to move the monitor mount 500 (any any attached monitor) outwardly from the housing of the cabinet of the gaming machine and has provided a greater amount of rotation of the monitor mount 500 relative to the housing. FIG. 1G shows the hinge assembly 50 in further partially open position. In this position, the hinge assembly 50 has continued to move the monitor mount 500 (any any attached monitor) outwardly from the housing of the cabinet of the gaming machine and has provided a substantially greater amount of rotation of the monitor mount 500 relative to the housing. FIG. 1H shows the hinge assembly 50 in the fully open position. To get to this position from the position shown in FIG. 1F, the hinge assembly 50 has at most slightly moved the monitor mount 500 (any any attached monitor) outwardly from the housing of the cabinet of the gaming machine and has continued to rotate the monitor mount 500 relative to the housing.

It should thus be appreciated that the hinge assembly 50 is configured to first primarily move the monitor (or the monitor support) outwardly from the housing of the cabinet of the gaming machine (while at most slightly rotating the monitor (or monitor support)) and then primarily rotate the monitor (or monitor support) relative to the housing while continuing to move the monitor (or the monitor support) outwardly at a slower rate or pace.

It should also be appreciated from the above that the gaming machine monitor hinge assembly of the present disclosure provides a compound motion for the monitor (or monitor support) as it opens. In particular, the gaming machine monitor hinge assembly of the present disclosure first primarily moves the monitor (or monitor support) outwardly from the housing, more or less linearly, for at least an inch or so to clear any security flanges and latching mechanisms of the cabinet. The gaming machine monitor hinge assembly then keeps moving the monitor (or monitor support) outwardly several more inches, enough for the middle of the monitor (or monitor support) to not swing into the housing. This part of the motion is less linear and more rotational. The gaming machine monitor hinge assembly then rotates the monitor (or monitor support) to a full 90 degrees within the footprint of the 28-inch width of the stand.

The gaming machine monitor hinge assembly of various embodiments of the present disclosure thus provides a double four-bar linkage mechanism. The second four-bar linkage is piggybacked on the first four-bar linkage mechanism and does most of the rotation of the monitor mount and thus the monitor (or monitor support). The geometries of the four-bar linkages are configured such that the first one has the greatest effect early in the motion, so the monitor (or monitor support) moves mostly outward. Later in the movement, the second has the greatest effect, to rotate the monitor (or monitor support) to the fully open position within the footprint of the housing of the cabinet of the gaming machine. The gaming machine monitor hinge assembly also enables the monitor (or monitor support) to appear to float in front of the housing in a stationary closed position and as the monitor (or monitor support) moves.

This arrangement solves the above described problems relating to relatively large curved monitors. More specifically, this enables relatively large curved monitors to be attached to a housing of a cabinet of a gaming machine and openable in a way that provides full service access inside the cabinet while not interfering with a neighboring gaming machine such as a neighboring gaming machine on a 28-inch pitch. This enables the construction of a gaming machine with a relatively large curved monitor that is attached to the housing of the cabinet and that enables the monitor (or the monitor support) to open a full 90 degrees while keeping the monitor (or the monitor support) close to the housing of the cabinet.

In this illustrated example embodiment, as shown in FIGS. 2A, 2B, 2C, 2D, 2E, 2F, and 2G, the first pivotable linkage 100 has a frame 110 including an upper portion 112, a lower portion 114, a first upper pivot member receiver 120, a second upper pivot member receiver 122, a third lower pivot member receiver 124, and a fourth lower pivot member receiver 126. These pivot member receivers are respectively configured to receive pivot hinge pins (such as the hinge pin 900 shown in FIGS. 12A, 12B, and 12C to facilitate pivoting) or shoulder screws (such as shoulder screws 950 shown in FIGS. 13A, 13B, and 13C to facilitate pivoting). Specifically, (a) hinge pins 900 are used in first upper pivot member receiver 120 and third lower pivot member receiver 124; and (b) shoulder screws 950 are used in second upper pivot member receiver 122 and fourth lower pivot member receiver 126. The first pivotable linkage 100 is configured to pivot about an inner or first vertical axis defined by the first upper pivot member receiver 120 and the third lower pivot member receiver 124. The first pivotable linkage 100 is also configured to pivot about an outer or second different vertical axis defined by the second upper pivot member receiver 122 and the fourth lower pivot member receiver 126. In this illustrated example embodiment, the top member of upper portion 112 of the frame 110 extends downwardly or is downwardly angled from the first upper pivot member 120 to the second upper pivot member receiver 122. In this illustrated example embodiment, the bottom member of the lower portion 114 of the frame 110 extends upwardly or is upwardly angled from the third lower pivot member receiver 124 to the fourth lower pivot member receiver 126.

In this illustrated example embodiment, the first pivotable linkage is formed from a suitable metal such as aluminum; however, it should be appreciated that the first pivotable linkage can be formed from other suitable materials. It should also be appreciated that the first pivotable linkage can be alternatively or differently configured in accordance with the present disclosure.

In this illustrated example embodiment, as shown in FIGS. 3A, 3B, 3C, 3D, 3E, 3F, and 3G, the second pivotable linkage 200 has a frame 210 including an upper portion 212, a lower portion 214, a first upper pivot member receiver 220, a second upper pivot member receiver 222, a third lower pivot member receiver 224, a fourth lower pivot member receiver 226, and a fifth upper pivot member receiver 228. These pivot member receivers are respectively configured to receive pivot hinge pins (such as the hinge pin 900 shown in FIGS. 12A, 12B, and 12C to facilitate pivoting) or shoulder screws (such as shoulder screws 950 shown in FIGS. 13A, 13B, and 13C to facilitate pivoting). Hinge pin 900 is used in second upper pivot member receiver 222 and fourth lower pivot member receiver 226. Shoulder screw 950 is used in first upper pivot member receiver 220, third lower pivot member receiver 224, and fifth upper pivot member receiver 228. The second pivotable linkage 200 is configured to pivot about an inner or first vertical axis defined by the second upper pivot member receiver 222 and the fourth lower pivot member receiver 226. The second pivotable linkage 200 is also configured to pivot about an intermediate or second different vertical axis defined by the first upper pivot member receiver 220 and the third lower pivot member receiver 224. The second pivotable linkage 200 is also configured to pivot about an outer or third different vertical axis defined by the fifth upper pivot member receiver 228. In this illustrated example embodiment, the top member of upper portion 212 of the frame 210 extends upwardly from the second upper pivot member 222 to the first upper pivot member receiver 220. In this illustrated example embodiment, the bottom member of the lower portion 214 of the frame 210 extends downwardly from the fourth lower pivot member receiver 226 to the third lower pivot member receiver 224.

In this illustrated example embodiment, the second pivotable linkage is formed from a suitable metal such as aluminum; however, it should be appreciated that the second pivotable linkage can be formed from other suitable materials. It should also be appreciated that the second pivotable linkage can be alternatively or differently configured in accordance with the present disclosure.

In this illustrated example embodiment, as shown in FIGS. 4A, 4B, 4C, 4D, 4E, 4F, and 4G, the third pivotable linkage 300 has a frame 310 including an upper portion 312, a lower portion 314, a first upper pivot member receiver 320, a second upper pivot member receiver 322, a third lower pivot member receiver 324, a fourth lower pivot member receiver 326, a fifth upper pivot member receiver 328, and a sixth lower pivot member receiver 330. These pivot member receivers are respectively configured to receive shoulder screws (such as shoulder screws 950 shown in FIGS. 13A, 13B, and 13C to facilitate pivoting). The third pivotable linkage 300 is configured to pivot about an inner or first vertical axis defined by the second upper pivot member receiver 322 and the fourth lower pivot member receiver 326. The third pivotable linkage 300 is also configured to pivot about an intermediate or second different vertical axis defined by the fifth upper pivot member receiver 328 and the sixth lower pivot member receiver 330. The third pivotable linkage 300 is also configured to pivot about an outer or third different vertical axis defined by the first upper pivot member receiver 320 and the third lower pivot member receiver 324. In this illustrated example embodiment, the top member of upper portion 312 of the frame 310 extends upwardly from the second upper pivot member 322 to the first upper pivot member receiver 320. In this illustrated example embodiment, the bottom member of the lower portion 314 of the frame 310 extends upwardly from the fourth lower pivot member receiver 326 to the third lower pivot member receiver 324. The frame 310 further includes a locking catch support 340 connected to and extending transversely inwardly from the bottom of the second portion 314. The locking catch support 340 is configured to support the locking catch 600 (described below) that is configured to lock the hinge assembly 50 in an open position such as the fully open position.

In this illustrated example embodiment, the third pivotable linkage is formed from a suitable metal such as aluminum; however, it should be appreciated that the third pivotable linkage can be formed from other suitable materials. It should also be appreciated that the third pivotable linkage can be alternatively or differently configured in accordance with the present disclosure.

In this illustrated example embodiment, as shown in FIGS. 5A, 5B, 5C, 5D, 5E, 5F, and 5G, the fourth pivotable linkage 400 has a frame 410 including an upper portion 412, a lower portion 414, a first pivot member receiver 420, and a second pivot member receiver 422. These pivot member receivers are respectively configured to receive shoulder screws (such as shoulder screws 950 shown in FIGS. 13A, 13B, and 13C to facilitate pivoting). The fourth pivotable linkage 400 is configured to pivot about an inner or first vertical axis defined by the second pivot member receiver 422. The fourth pivotable linkage 400 is also configured to pivot about an outer or second different vertical axis defined by the first pivot member receiver 420. In this illustrated example embodiment, the top member which functions as the upper portion 412 of the frame 410 extends upwardly from the second pivot member 422 to the first pivot member receiver 420. In this illustrated example embodiment, the bottom member which functions as the lower portion 414 of the frame 410 also extends upwardly from the second pivot member 422 to the first pivot member receiver 420.

In this illustrated example embodiment, the fourth pivotable linkage is formed from a suitable plastic such as glass-filled nylon; however, it should be appreciated that the fourth pivotable linkage can be formed from other suitable materials. It should also be appreciated that the fourth pivotable linkage can be alternatively or differently configured in accordance with the present disclosure.

In this illustrated example embodiment, as shown in FIGS. 6A, 6B, 6C, 6D, 6E, 6F, 6G, and 6H, the monitor mount 500 has a frame 510 including a first horizontally or substantially horizontally extending portion 512, a second vertically or substantially vertically extend portion 514, a first upper pivot member receiver 520, a second upper pivot member receiver 522, and a third lower pivot member receiver 526. These pivot member receivers are respectively configured to receive shoulder screws (such as shoulder screws 950 shown in FIGS. 13A, 13B, and 13C to facilitate pivoting). The monitor mount 500 is configured to pivot about an inner or first vertical axis defined by the second upper pivot member receiver 522 and the third lower pivot member receiver 526. The monitor mount 500 is also configured to pivot about an outer or second different vertical axis defined by the second upper pivot member receiver 520. The frame 510 includes a somewhat triangular brace 530 extending between and connected to the first portion 512 and the second portion 514. The frame 510 and specifically the first portion 512 and the second portion 514 of the frame 510 are configured to be suitably securely attached to the back of the monitor (or monitor support) as best shown in FIGS. 14E and 14F such that movement of the monitor mount 500 causes movement of the monitor (or monitor support). The frame 510 further includes a locking catch receiver 540 connected to and extending transversely from the bottom of the second portion 514. The locking catch receiver 540 is configured to receive a locking arm 618 of the locking catch 600 (described below) to lock the hinge assembly 50 in an open position such as the fully open position.

In this illustrated example embodiment, the monitor mount is formed from a suitable metal such as steel; however, it should be appreciated that the monitor mount can be formed from other suitable materials. It should also be appreciated that the monitor mount can be alternatively or differently configured in accordance with the present disclosure.

In this illustrated example embodiment, as shown in FIGS. 9A, 9B, 9C, 9D, 9E, and 9F, the locking catch 600 includes a slidable bracket 610 and a handle 630 extending from the slidable bracket 610. The slidable bracket 610 includes a mounting plate 612 that is configured to be slidably mounted on or to the locking support 340 of the third pivotable linkage 300. The mounting plate 612 defines an oval vertically or substantially vertically extending mounting slot 614 configured to receive a mounting screw which partially connects the mounting plate 612 to the locking support 340 and that enables the mounting plate 612 to be slidably mounted on or to the locking support 340. The slidable bracket 610 also includes a locking arm 618 extending downwardly from the mounting plate 612 and configured to extend into one of the slots in the locking catch receiver 540 of the monitor mount 500 to lock the hinge assembly in an open position such as the fully open position. The handle 630 in this illustrated embodiment includes a spring-loaded plunger. The handle 630 holds the bracket 610 in either the upward or downward position by engaging an upper hole (not shown) or a lower hole (not shown) in locking support 340. The handle is retractable by hand to enable the bracket to slide. The handle 630 is thus movably connected to and extends transversely from the mounting plate 612 of the slidable bracket 610. The handle 630 enables a person to slide the mounting plate 612 of the slidable bracket 610 downwardly to cause the locking arm 618 to extend into one of the slots in the locking catch receiver 540 of the monitor mount 500 to lock the hinge assembly 50 in an open position such as the fully open position. The handle 630 also enables a person to slide the mounting plate 612 of the slidable bracket 610 upwardly to cause the locking arm 618 to be removed from one of the slots in the locking catch receiver 540 of the monitor mount 500 to unlock the hinge assembly 50.

It should thus be appreciated that the locking catch 600 is configured, arranged, and attached to the third pivotable linkage 300 such that it enables a person who services the gaming machine to lock the hinge assembly 50 in one of the open positions such as the fully open position shown in FIG. 1H to enable such person to service interior components (not shown) of the gaming machine 10. It should be appreciated that in other embodiments of the present disclosure, the hinge assembly does not include such a locking catch.

In this illustrated example embodiment, the locking catch is formed from a suitable metal such as steel; however, it should be appreciated that the locking catch can be formed from other suitable materials. It should also be appreciated that the locking catch can be alternatively or differently configured in accordance with the present disclosure.

In this illustrated example embodiment, as shown in FIGS. 7A, 7B, 7C, and 7D, the damper 700 includes a piston 710, a shaft 720 extendable from the piston 710, an inner mount 730 connected to the end of the piston 710, and an outer mount 740 connected to the end of the shaft 720 opposite the piston 710. In this illustrated example embodiment, as shown in FIGS. 8A, 8B, 8C, 8D, 8E, and 8F, the plurality of mounting brackets includes a damper mounting bracket 810. The damper mounting bracket is used two places in this illustrated embodiment, and particularly the back wall of the housing and on linkage 100. The damper mounting bracket 810 includes a mounting plate 820 configured to be attached to the back wall of the housing 30 of the cabinet 20 of the gaming machine 10, and a pin support 822 connected to and extending transversely from the mounting plate 820. The damper mounting bracket 810 also includes an upwardly extending pin 824 connected to and extending upwardly from the pin support 822. The inner mount 730 of the damper 700 is pivotally connected to the pin 824 of the damper mounting bracket 810. The outer mount 740 of the damper 700 is pivotally connected to the frame 110 of the first pivotable linkage assembly 100 (as shown in FIGS. 1A and 1B) by a second same mounting bracket 810.

It should be appreciated that the damper 700 is configured, arranged, and attached to the first pivotable linkage 100 and the interior of the housing 30 of the cabinet 20 of the gaming machine 10 to prevent the monitor (or monitor support) from closing too quickly. It should be appreciated that in other embodiments of the present disclosure, the hinge assembly does not include such a damper. It should also be appreciated that the damper could be attached to other links, or between two of the links.

In this illustrated example embodiment, the damper is formed from a suitable metal such as steel; however, it should be appreciated that the damper can be formed from other suitable materials. It should also be appreciated that the damper can be alternatively or differently configured in accordance with the present disclosure. In this illustrated example embodiment, the damper mounting bracket is formed from a suitable metal such as steel; however, it should be appreciated that the damper mounting bracket can be formed from other suitable materials. It should also be appreciated that the damper assembly can be alternatively or differently configured in accordance with the present disclosure.

In this illustrated example embodiment, the plurality of attachment mechanisms includes a plurality of hinge pins such as hinge pin 900 shown in FIGS. 12A, 12B, and 12C. In this illustrated example embodiment, the plurality of attachment mechanisms also includes a plurality of fasteners or connectors such as shoulder screw 950 shown in FIGS. 13A, 13B, and 13C. The use of these hinge pins 900 and shoulder screws 950 are generally described above. In this illustrated example embodiment, the hinge pins are formed from a suitable metal such as steel; however, it should be appreciated that the hinge pins can be formed from other suitable materials. It should also be appreciated that the hinge pins can be alternatively or differently configured in accordance with the present disclosure. In this illustrated example embodiment, the shoulder screws are formed from a suitable metal such as steel; however, it should be appreciated that the shoulder screws can be formed from other suitable materials. It should also be appreciated that the shoulder screws can be alternatively or differently configured in accordance with the present disclosure.

In this illustrated example embodiment, as shown in FIGS. 10A, 10B, 100, 10D, 10E, 10F, and 10G, the plurality of mounting brackets includes an upper hinge pin mounting bracket 830. The upper hinge pin mounting bracket 830 includes a hinge pin receiver 832 configured to support and receive one of the hinge pins 900. The upper hinge pin mounting bracket 830 also includes a mounting plate 834 connected to the hinge pin receiver 832 and a mounting arm 836 extending from the mounting plate 834. The upper hinge pin mounting bracket 830 further includes one or more supporting or strengthening walls.

In this illustrated example embodiment, the upper hinge pin mounting bracket is formed from a suitable metal such as steel; however, it should be appreciated that the upper hinge pin mounting bracket can be formed from other suitable materials. It should also be appreciated that the upper hinge pin mounting bracket can be alternatively or differently configured in accordance with the present disclosure.

In this illustrated example embodiment, as shown in FIGS. 11A, 11B, 110, 11D, 11E, 11F, and 11G, the plurality of mounting brackets includes a lower hinge pin mounting bracket 850. The lower hinge pin mounting bracket 850 includes a hinge pin receiver 852 configured to support and receive one of the hinge pins 900. The lower hinge pin mounting bracket 850 also includes a mounting plate 854 connected to the hinge pin receiver 852. The lower hinge pin mounting bracket 850 further includes one or more supporting or strengthening walls.

In this illustrated example embodiment, the lower hinge pin mounting bracket is formed from a suitable metal such as steel; however, it should be appreciated that the lower hinge pin mounting bracket can be formed from other suitable materials. It should also be appreciated that the lower hinge pin mounting bracket can be alternatively or differently configured in accordance with the present disclosure.

Figure 14E:
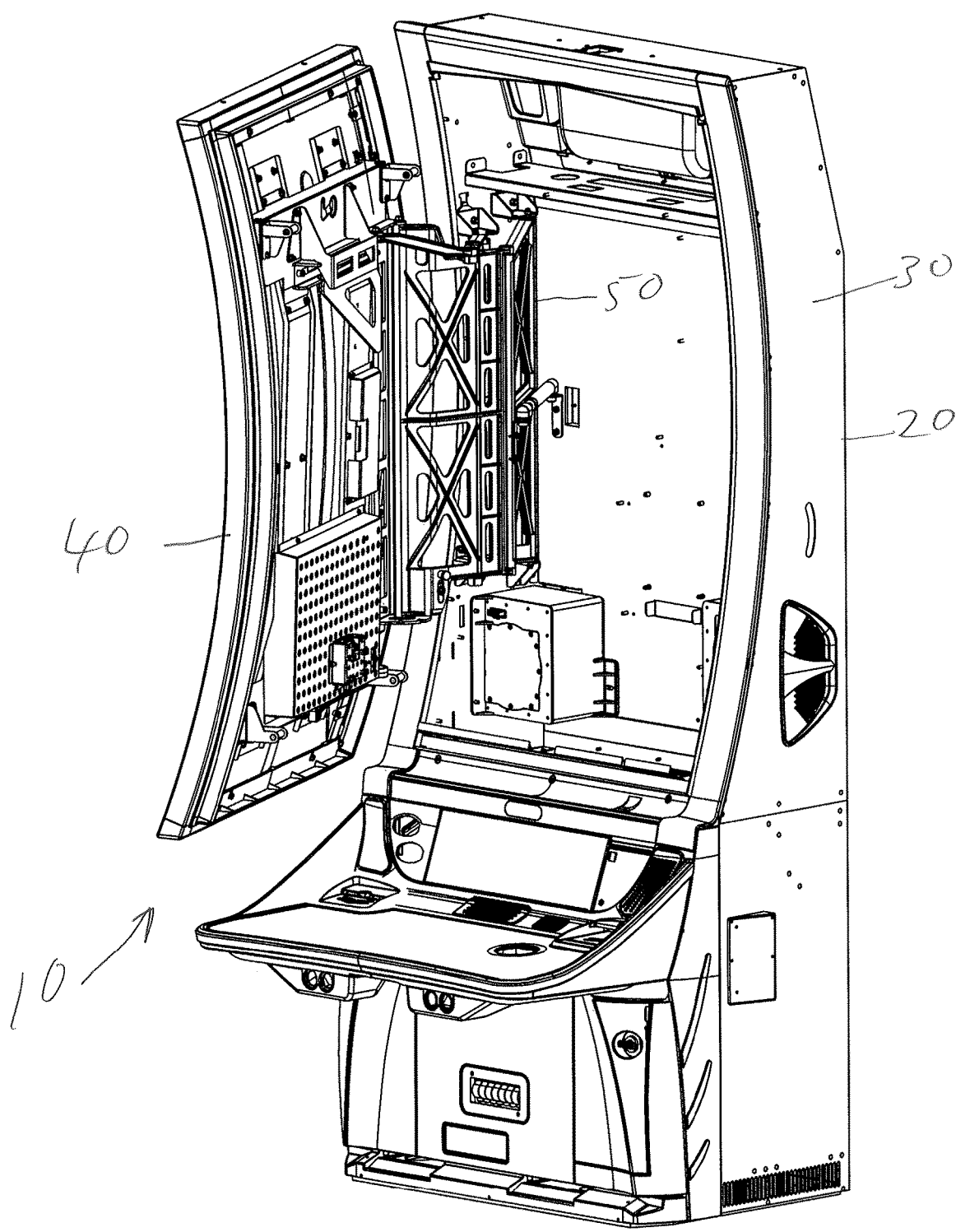
FIG. 14E is a front perspective view of the gaming machine of FIG. 14A, with the hinge assembly and the monitor in an even further partially open position where the monitor has moved slightly further outwardly from the housing and has further substantially rotated.
Figure 15A:
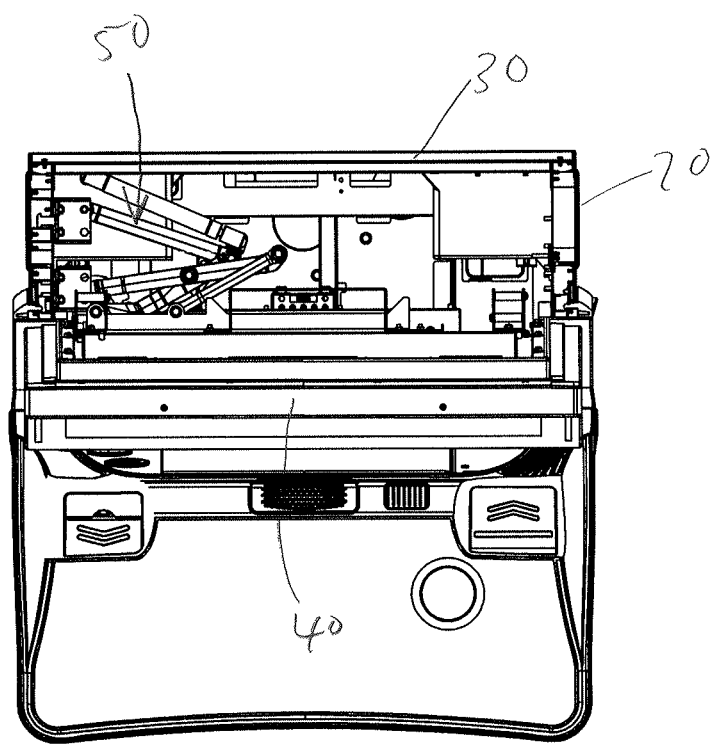
FIG. 15A is a top view of a gaming machine of FIG. 14A (shown with part of the top of the housing removed), with the hinge assembly and the monitor in the fully closed position.
Figure 15C:
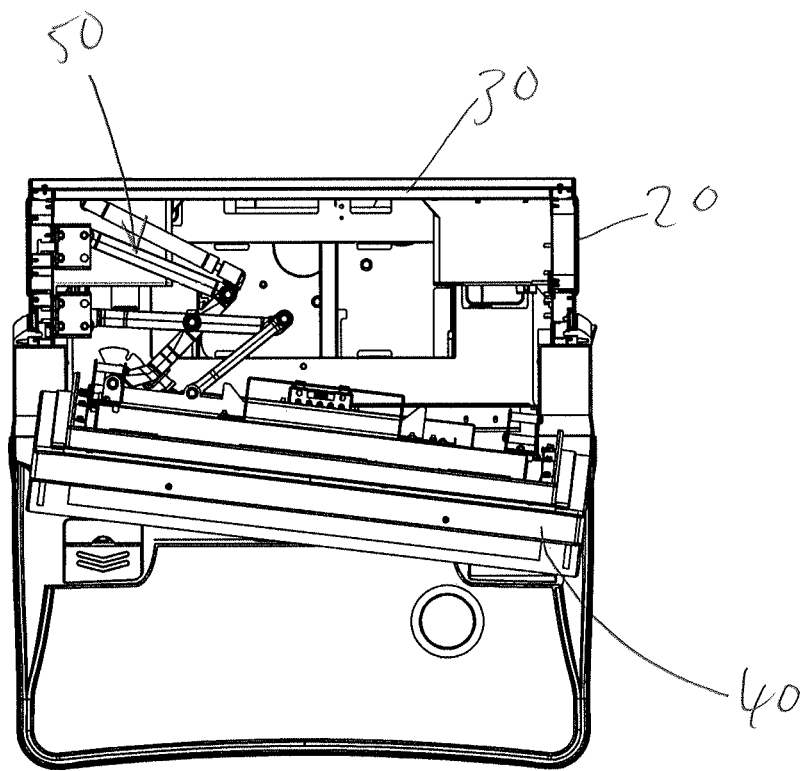
FIG. 15C is a top view of a gaming machine of FIG. 14A (shown with part of the top of the housing removed), with the hinge assembly and the monitor in a further partially open position where the monitor has moved further outwardly from the housing and has slightly rotated.

Referring now to FIGS. 14A to 15F, the monitor hinge assembly 50 of this illustrated embodiment is shown employed in the gaming machine 10 that includes the cabinet 20 having a housing 30, and a relatively large curved monitor 40 which includes the monitor support for ease of description. The hinge assembly 50 is connected to the housing and the monitor 40 (or monitor support), and supports the monitor 40 (or monitor support). FIGS. 14A and 15A show the hinge assembly 50 and the monitor 40 in the fully closed position. FIGS. 14B and 15B show the hinge assembly 50 and the monitor 40 in an initial partially open position where the monitor 40 has moved outwardly from the housing 30 of the cabinet 20. FIGS. 14C and 15C show the hinge assembly 50 and the monitor 40 in a further partially open position where the monitor 40 has moved further outwardly from the housing 30 of the cabinet 20 and has slightly rotated. FIGS. 14D and 15D show the hinge assembly 50 and the monitor 40 in a still further partially open position where the monitor 40 has moved slightly further outwardly from the housing 30 of the cabinet 20 and has substantially rotated. FIGS. 14E and 15E show the hinge assembly 50 and the monitor 40 in an even further partially open position where the monitor 40 has moved slightly further outwardly from the housing 30 of the cabinet 20 and has further substantially rotated. FIGS. 14F and 15F show the hinge assembly 50 and the monitor 40 in a fully open position where the monitor 40 has moved further slightly outwardly from the housing 30 of the cabinet 20 and substantially rotated to a 90 degree orientation relative to the housing 30.

The hinge assembly of the present disclosure may be also be implemented in other types of machines that support a curved monitor, other curved device, or other device.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming machine comprising:
   a cabinet comprising a housing:
   a curved monitor; and
   a hinge assembly connected to the housing and the curved monitor, said hinge assembly comprising:
   a monitor mount connected to the curved monitor;
   first, second, third, and fourth pivotable linkages, wherein
   the first pivotable linkage is pivotally connected to the housing and the third pivotable linkage;
   the second pivotable linkage is pivotally connected to the housing, the third pivotable linkage, and the fourth pivotable linkage;
   the third pivotable linkage is pivotally connected to the first pivotable linkage, the second pivotable linkage, and the monitor mount; and
   the fourth pivotable linkage is pivotally connected to the second pivotable linkage and the monitor mount; and
   a damper pivotally connected to the housing and the first pivotable linkage,
   wherein the second pivotable linkage comprises a first intermediate pivot point, the third pivotable linkage comprises a second intermediate pivot point, and wherein the second and third pivotable linkages are pivotally connected along an axis extending through the respective first and second intermediate pivot points such that the second pivotable linkage extends transversely across the third pivotable linkage.

2. The gaming machine of claim 1, wherein the hinge assembly comprising a locking catch connected to the third pivotable linkage and configured to engage the monitor mount.

3. The gaming machine of claim 1, wherein the first pivotable linkage, the second pivotable linkage, the third pivotable linkage, the fourth pivotable linkage, and the monitor mount are configured to enable the hinge assembly to move from a closed position to a plurality of partially open positions to a fully open position.

4. The gaming machine of claim 1, wherein the hinge assembly is configured to first primarily move the monitor outwardly from the housing of the cabinet while at most slightly rotating the monitor.

5. The gaming machine of claim 4, wherein the hinge assembly is configured to subsequently primarily rotate the monitor relative to the housing while continuing to move the monitor outwardly at a slower rate.

6. The gaming machine monitor hinge assembly of claim 1, which provides an automatic compound opening motion of mostly-translate-changing-to-mostly-rotate when opening.

7. The gaming machine monitor hinge assembly of claim 6, which provides an automatic compound closing motion of mostly-rotate-changing-to-mostly-translate when closing.

8. The gaming machine monitor hinge assembly of claim 1, which provides an automatic compound closing motion of mostly-rotate-changing-to-mostly-translate when closing.

9. A gaming machine monitor hinge assembly configured to be connected to a housing and a curved monitor of the gaming machine, said gaming machine monitor hinge assembly comprising:
   a monitor mount connected to the curved monitor;
   first, second, third, and fourth pivotable linkages, wherein
   the first pivotable linkage is pivotally connected to the housing and the third pivotable linkage;
   the second pivotable linkage is pivotally connected to the housing, the third pivotable linkage, and the fourth pivotable linkage;
   the third pivotable linkage is pivotally connected to the first pivotable linkage, the second pivotable linkage, and the monitor mount; and
   the fourth pivotable linkage is pivotally connected to the second pivotable linkage and the monitor mount; and
   a damper pivotally connected to the housing and the first pivotable linkage,
   wherein the second pivotable linkage comprises a first intermediate pivot point, the third pivotable linkage comprises a second intermediate pivot point, and wherein the second and third pivotable linkages are pivotally connected along an axis extending through the respective first and second intermediate pivot points such that the second pivotable linkage extends transversely across the third pivotable linkage.

10. The gaming machine monitor hinge assembly of claim 9, which comprises a locking catch connectable to the third pivotable linkage and configured to engage the monitor mount.

11. The gaming machine monitor hinge assembly of claim 9, wherein the first pivotable linkage, the second pivotable linkage, the third pivotable linkage, the fourth pivotable linkage, and the monitor mount are configured to enable the hinge assembly to move from a closed position to a plurality of partially open positions to a fully open position.

12. The gaming machine monitor hinge assembly of claim 9, which is configured to first primarily move the monitor outwardly from the housing while at most slightly rotating the monitor.

13. The gaming machine monitor hinge assembly of claim 12, which is configured to subsequently primarily rotate the monitor relative to the housing while continuing to move the monitor outwardly at a slower rate.

14. The gaming machine monitor hinge assembly of claim 9, which provides an automatic compound opening motion of mostly-translate-changing-to-mostly-rotate when opening.

15. The gaming machine monitor hinge assembly of claim 14, which provides an automatic compound closing motion of mostly-rotate-changing-to-mostly-translate when closing.

16. The gaming machine monitor hinge assembly of claim 10, which provides an automatic compound closing motion of mostly-rotate-changing-to-mostly-translate when closing.

* * * * *